(12) United States Patent
Nikolla et al.

(10) Patent No.: US 11,155,473 B2
(45) Date of Patent: Oct. 26, 2021

(54) NANOSTRUCTURED MIXED METAL OXIDES AS CATALYSTS AND METHOD OF MAKING THEREOF

(71) Applicant: Wayne State University, Detroit, MI (US)

(72) Inventors: Eranda Nikolla, Troy, MI (US); Bingwen Wang, Riverview, MI (US); Ayad Nacy, Sterling Heights, MI (US)

(73) Assignee: Wayne State University, Detroit, MI (US)

(*) Notice: Subject to any disclaimer, the term of this patent is extended or adjusted under 35 U.S.C. 154(b) by 52 days.

(21) Appl. No.: 16/208,785

(22) Filed: Dec. 4, 2018

(65) Prior Publication Data

US 2019/0169043 A1 Jun. 6, 2019

Related U.S. Application Data

(60) Provisional application No. 62/594,140, filed on Dec. 4, 2017.

(51) Int. Cl.
*C10G 53/04* (2006.01)
*H01M 4/90* (2006.01)
(Continued)

(52) U.S. Cl.
CPC .......... *C01G 53/006* (2013.01); *B01J 23/002* (2013.01); *B01J 23/63* (2013.01); *B01J 23/83* (2013.01);
(Continued)

(58) Field of Classification Search
CPC ...... C10G 53/006; C10G 53/68; C10G 53/70; G10G 55/002; B01J 37/03
See application file for complete search history.

(56) References Cited

U.S. PATENT DOCUMENTS 5,770,172 A * 6/1998 Linehan ............... B01J 35/0013
208/420

OTHER PUBLICATIONS

Ma et al (Synthesis of shape-controlled La2NiO4+δ nanostructures and their anisotropic properties for oxygen diffusion, Chem. Commun. 2015, vol. 51, p. 137-140).*
(Continued)

*Primary Examiner* — Jun Li
(74) *Attorney, Agent, or Firm* — Fishman Stewart PLLC

(57) ABSTRACT

A method of forming a metal oxide material having a rod shape or polyhedral nanostructure includes preparing a first reverse micro-emulsion system comprising an aqueous precipitating agent dispersion and a second reverse micro-emulsion system containing an aqueous metal salt dispersion; combining the micro-emulsions together to initiate a reaction; allowing the reaction to continue to form a product mixture comprising a metal oxide gel and aqueous media; separating the metal oxide gel from the aqueous media; collecting the metal oxide gel; and calcining the metal oxide gel to form the metal oxide material. The metal oxide material corresponds to the chemical formula of $La_2M_xNi_{1-x}O_4$, $Pr_{2-y}A_yNiO_4$, or $La_{2-z}D_zNiO_4$, wherein M is copper, cobalt, iron, manganese, chromium, aluminum, or platinum; A is lanthanum or neodymium; D is calcium, barium or strontium; x ranges from 0 to 1; y ranges from 0 to 2; and z ranges from 0 to 0.25.

22 Claims, 41 Drawing Sheets

(51) Int. Cl.

| | | |
|---|---|---|
| *C01G 53/00* | (2006.01) | |
| *B01J 37/03* | (2006.01) | |
| *B01J 37/08* | (2006.01) | |
| *B01J 23/00* | (2006.01) | |
| *C01G 55/00* | (2006.01) | |
| *B01J 23/83* | (2006.01) | |
| *B01J 23/63* | (2006.01) | |
| *B01J 37/00* | (2006.01) | |
| *B01J 35/00* | (2006.01) | |
| *B01J 35/02* | (2006.01) | |
| *B01J 23/89* | (2006.01) | |
| *B82Y 30/00* | (2011.01) | |
| *B82Y 40/00* | (2011.01) | |

(52) U.S. Cl.
CPC .......... *B01J 35/00* (2013.01); *B01J 35/0013* (2013.01); *B01J 37/009* (2013.01); *B01J 37/03* (2013.01); *B01J 37/031* (2013.01); *B01J 37/036* (2013.01); *B01J 37/08* (2013.01); *C01G 53/68* (2013.01); *C01G 53/70* (2013.01); *C01G 55/002* (2013.01); *H01M 4/9033* (2013.01); *B01J 23/894* (2013.01); *B01J 35/026* (2013.01); *B01J 2523/3706* (2013.01); *B01J 2523/3718* (2013.01); *B01J 2523/828* (2013.01); *B01J 2523/847* (2013.01); *B82Y 30/00* (2013.01); *B82Y 40/00* (2013.01); *C01P 2002/34* (2013.01); *C01P 2002/72* (2013.01); *C01P 2002/85* (2013.01); *C01P 2004/03* (2013.01); *C01P 2004/04* (2013.01); *C01P 2004/16* (2013.01)

(56) References Cited

OTHER PUBLICATIONS

Shen et al., Preparation and electrical properties of Ca-doped La2NiO4+δ cathode materials for IT-SOFC, Physical Chemistry Chemical Physics, Dec. 2010, p. 15124-15131).*

Burriel et al., Enhancing total conductivity of La2NiO4+δ epitaxial thin films by reducing thickness, J. Phys. Chem C 2008, 112 p. 10982-10987.*

* cited by examiner (A)

|  | $O_O^X + V_i \to V_O^{\bullet\bullet} + O_i$ | | $O_2 + V_O^{\bullet\bullet} + * \to O* + O_O^X$ | |
| --- | --- | --- | --- | --- |
|  | $E_{TS}$(eV) | $\Delta G$(eV) | $E_{TS}$(eV) | $\Delta G$(eV) |
| $La_2MnO_4$ | 1.30 | 0.39 | -1.35 | -2.31 |
| $La_2FeO_4$ | 1.44 | 0.13 | -0.85 | -1.77 |
| $La_2CoO_4$ | 1.15 | -0.04 | 0.21 | -0.49 |
| $La_2NiO_4$ | 1.61 | 0.32 | 1.90 | 1.76 |
| $La_2Ni_{0.5}Al_{0.5}O_4$ | 1.71 | 0.27 | -2.58 | -2.84 |
| $La_2Ni_{0.5}Mn_{0.5}O_4$ | 1.79 | 0.21 | -0.75 | -1.97 |
| $La_2Ni_{0.5}Fe_{0.5}O_4$ | 1.57 | 0.29 | -0.21 | -1.21 |
| $La_2Ni_{0.5}Co_{0.5}O_4$ | 1.14 | 0.18 | 0.56 | -0.12 |
| $La_2Ni_{0.5}Cu_{0.5}O_4$ | 1.96 | 1.28 | 1.99 | 1.83 |

(B)

|  | $BE_O$(eV) | $BE_{O_2}$(eV) | $E_{V_O^{\bullet\bullet}}$(eV) |
| --- | --- | --- | --- |
| $La_2MnO_4$ | -0.61 | -3.47 | 3.35 |
| $La_2FeO_4$ | -0.43 | -2.61 | 2.08 |
| $La_2CoO_4$ | 0.15 | -2.06 | 1.38 |
| $La_2NiO_4$ | 1.35 | -1.18 | 0.33 |
| $La_2Ni_{0.5}Al_{0.5}O_4$ | -0.83 | -4.67 | 4.36 |
| $La_2Ni_{0.5}Mn_{0.5}O_4$ | -0.42 | -2.99 | 3.04 |
| $La_2Ni_{0.5}Fe_{0.5}O_4$ | -0.03 | -2.39 | 1.92 |
| $La_2Ni_{0.5}Co_{0.5}O_4$ | 0.37 | -1.80 | 1.23 |
| $La_2Ni_{0.5}Cu_{0.5}O_4$ | 1.22 | -1.19 | 0.14 |

Figure 6

| Catalyst | Active Metal | Stoichiometric Ratio | BET Surface Area ($m^2/g$) | Active surface area |
|---|---|---|---|---|
| Cr-LNO | Ni | 0.88 | 16.71 | 0.93 |
| Mn-LNO | Mn | 0.12 | 11.40 | 0.57 |
| Co-LNO | Co | 0.12 | 13.33 | 0.54 |
| LNO | Ni | 1 | 12.52 | 1 |
| Cu-LNO | Ni | 0.88 | 13.64 | 0.93 |

The active surface area ratio is calculated using the equation below:

$$\text{active surface area ratio} = \frac{(\text{loading ratio}_{catalyst} \times \text{BET area}_{catalyst} \times \text{stoichiometric ratio}_{active\ site}) + (\text{loading ratio}_{carbon} \times \text{BET area}_{carbon})}{(\text{loading ratio}_{catalyst} \times \text{BET area}_{catalyst}) + (\text{loading ratio}_{carbon} \times \text{BET area}_{carbon})}$$

The loading ratio for the components of the slurry used in the thin-film deposition is 5:1:1 (catalyst:carbon:binder) consistent for all oxides, while the stoichiometric ratio is the stoichiometric coefficient of the active B-site component in the catalyst. We note that BET surface area of Vulcan XC-72R carbon is ~ 270 $m^2/g$. The current density normalization becomes:

$$\text{current density} \left(\frac{mA}{cm^2_{active\ area}}\right) = \frac{\text{background subtracted current (mA)}}{\text{total electrode area }(cm^2) \times \text{ active surface area ratio}}$$

Figure 9b

| Catalyst | BET Surface Area ($m^2/g$) |
|---|---|
| LNO | 15.7 |
| Co-LNO | 11.9 |
| Cu-LNO | 12.9 |
| Fe-LNO | 16.6 |

Figure 22

| Trial | Collection Efficiency (N) | | | | Mean |
|---|---|---|---|---|---|
| | 400 rpm | 900 rpm | 1600 rpm | 2500 rpm | |
| 1 | 0.25 | 0.25 | 0.25 | 0.24 | 0.25 |
| 2 | 0.24 | 0.24 | 0.24 | 0.24 | 0.24 |
| 3 | 0.25 | 0.25 | 0.24 | 0.24 | 0.24 |

Figure 34

| Temperature (K) | Maximum Power Density (W cm$^{-2}$) | |
| --- | --- | --- |
| | This work | Literature |
| 1073 | 0.73 | 0.81 (*12*) |
| | | 0.48 (*13*) |
| 973 | 0.48 | 0.18 (*13*) |
| 923 | 0.31 | 0.15 (*13*) |

Figure 39

NANOSTRUCTURED MIXED METAL OXIDES AS CATALYSTS AND METHOD OF MAKING THEREOF

CROSS-REFERENCE TO RELATED APPLICATIONS

This application claims the benefit of U.S. Provisional Application No. 62/594,140 filed on Dec. 4, 2017, the entirety of which is hereby incorporated by reference.

FEDERALLY SPONSORED RESEARCH AND DEVELOPMENT

This invention was made with government support under no. DE-SC0014347 awarded by the United States Department of Energy (DOE) and under contract no. CBET-1434696 awarded by the National Science Foundation.

FIELD

This disclosure relates generally to nanostructured non-precious mixed metal oxides as heterogeneous catalysts. In addition, this disclosure relates to efficient electrocatalysis by such nanostructured mixed metal oxides.

BACKGROUND

The statements in this section merely provide background information related to the present disclosure and may not constitute prior art.

Efficient chemical transformations associated with electrochemical oxygen reduction (ORR) and evolution (OER) reactions are critical in the development of economically viable energy conversion and storage devices, such as fuel cells, electrolyzers, and metal-air batteries. Although the current state-of-art Pt-based electrocatalysts have shown to exhibit high activity for ORR in acidic and alkaline media, the high cost of Pt is a significant challenge for commercialization. The use of nonprecious metals and metal oxides as electrocatalysts can significantly alleviate this problem, but these are limited by their instability in the acidic media of most relevant electrochemical systems, such as proton exchange membrane fuel cells (PEMFCs).

Commonly used perovskite electrocatalysts exhibit high over-potential losses for these reactions. Consequently, operation of these systems at elevated temperatures is required to achieve reasonable electrochemical rates, resulting in high cost, low energy efficiency, and slow start-up and shutdown cycles. Development of more active and stable electrocatalysts for ORR/OER is imperative to improve the performance of these systems, lower their operating temperatures, and enhance their potential for alleviating challenges with the current energy infrastructure.

DRAWINGS

In order that the disclosure may be well understood, there will now be described various forms thereof, given by way of example, reference being made to the accompanying drawings.

Figure 3:
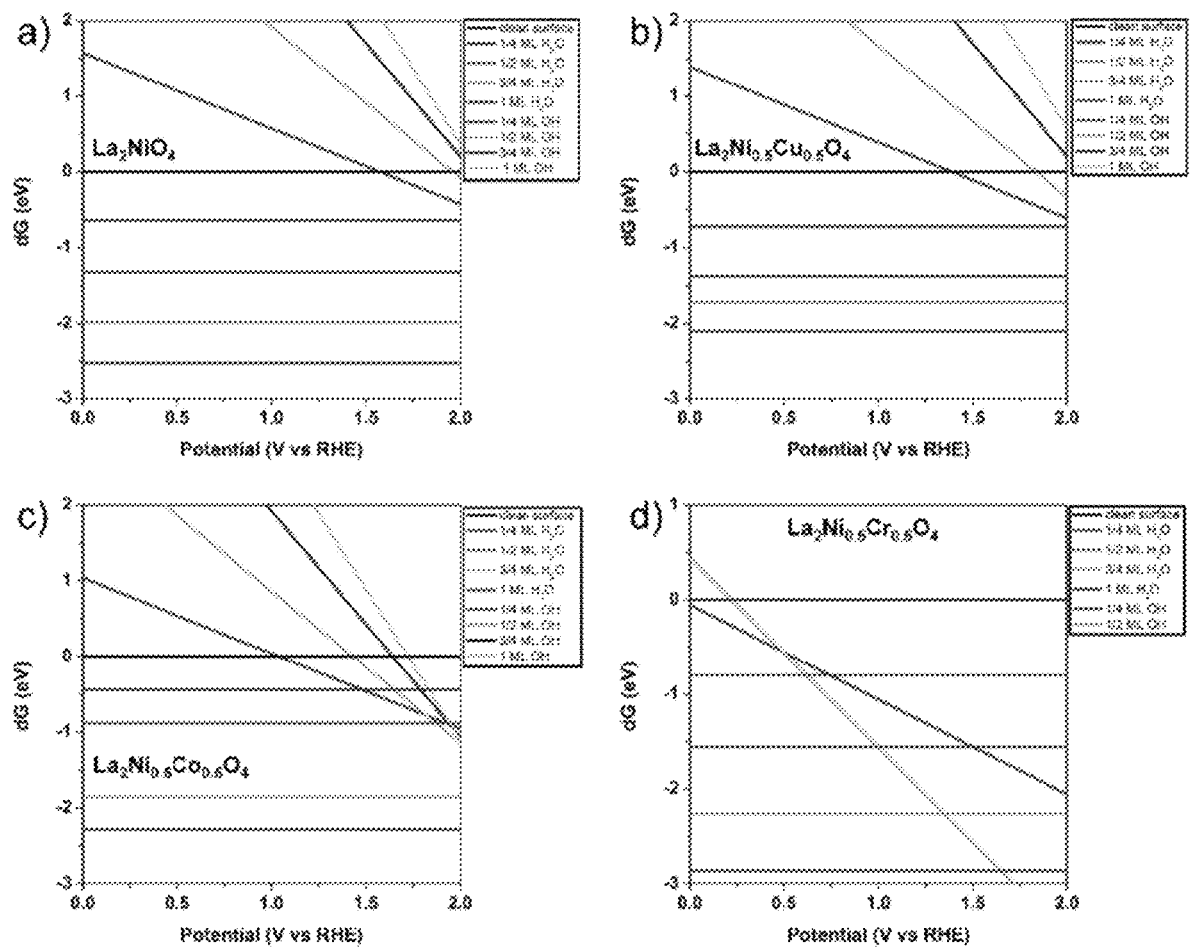

FIG. 3 includes surface phase diagrams of (001) terminated $La_2NiO_4$, $La_2Ni_{0.5}Cu_{0.5}O_4$, $La_2Ni_{0.5}Co_{0.5}O_4$, and $La_2Ni_{0.5}Cr_{0.5}O_4$ as a function of potential at pH of 13.

Figure 4:
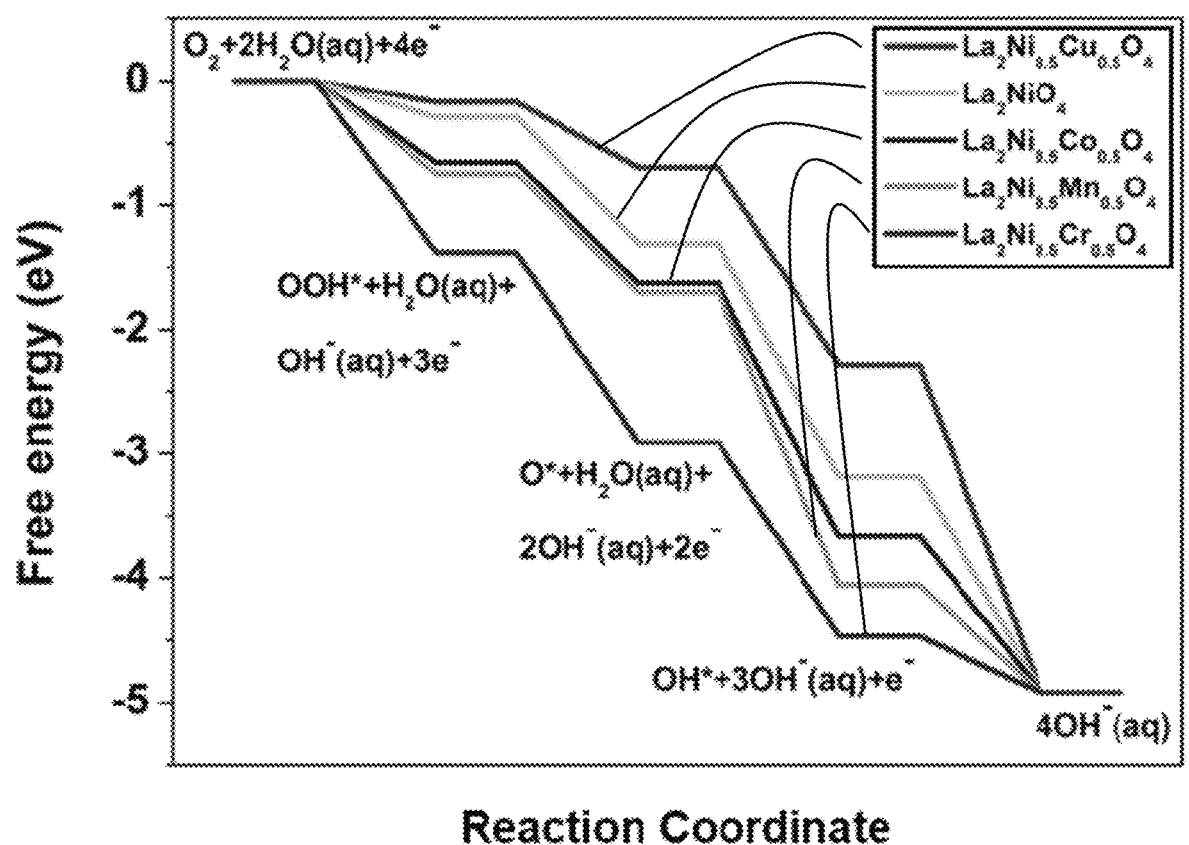

FIG. 4 is a free energy diagrams for ORR on pure and transition metal doped $La_2NiO_4$ at a potential of 0 V (vs RHE) and pH of 13.

Figure 5:
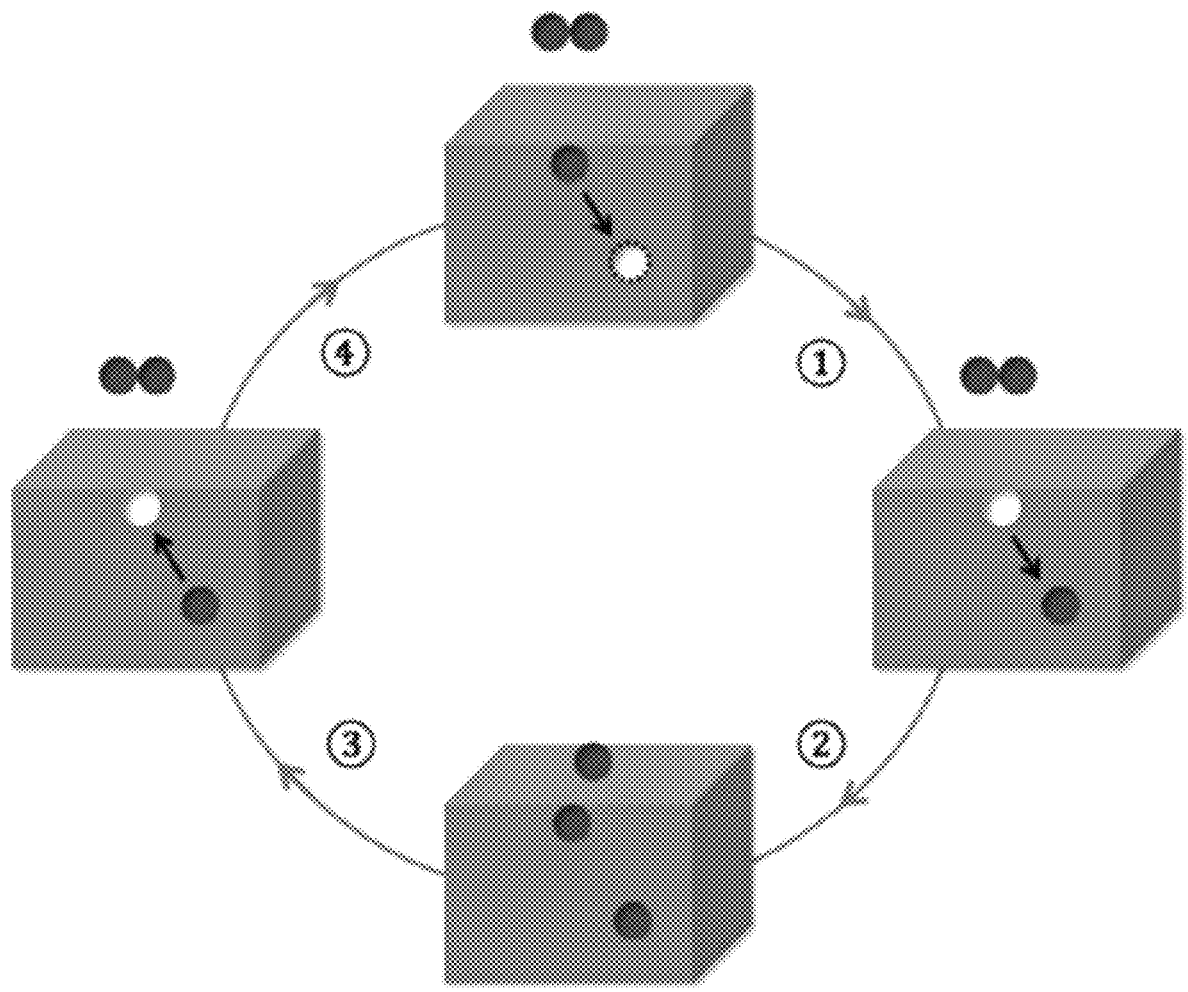

FIG. 5 demonstrates a proposed mechanism for surface oxygen exchange on first-series R-P oxides. Red, dashed white, and white spheres represent the O atoms, vacant interstitial sites, and surface oxygen vacancies, respectively.

FIG. 6 are tables that show (a) calculated barriers and Gibbs free energy change for surface lattice O diffusion into an interstitial site and $O_2$ dissociation on surface O vacancy on B-site terminated (001) surface of R-P oxides at 773 K and 0.21 atm; and (b) calculated binding energies of O adatom (BEo), $O_2$ on a surface O vacancy (BEo$_2$), and surface O vacancy formation energies (Ev••) on B-site terminated (001) surface of R-P oxides. Ev•• is calculated with respect to a half $O_2$ in gas phase with the consideration of entropic contribution at 773 K and 0.21 atm.

Figure 7:
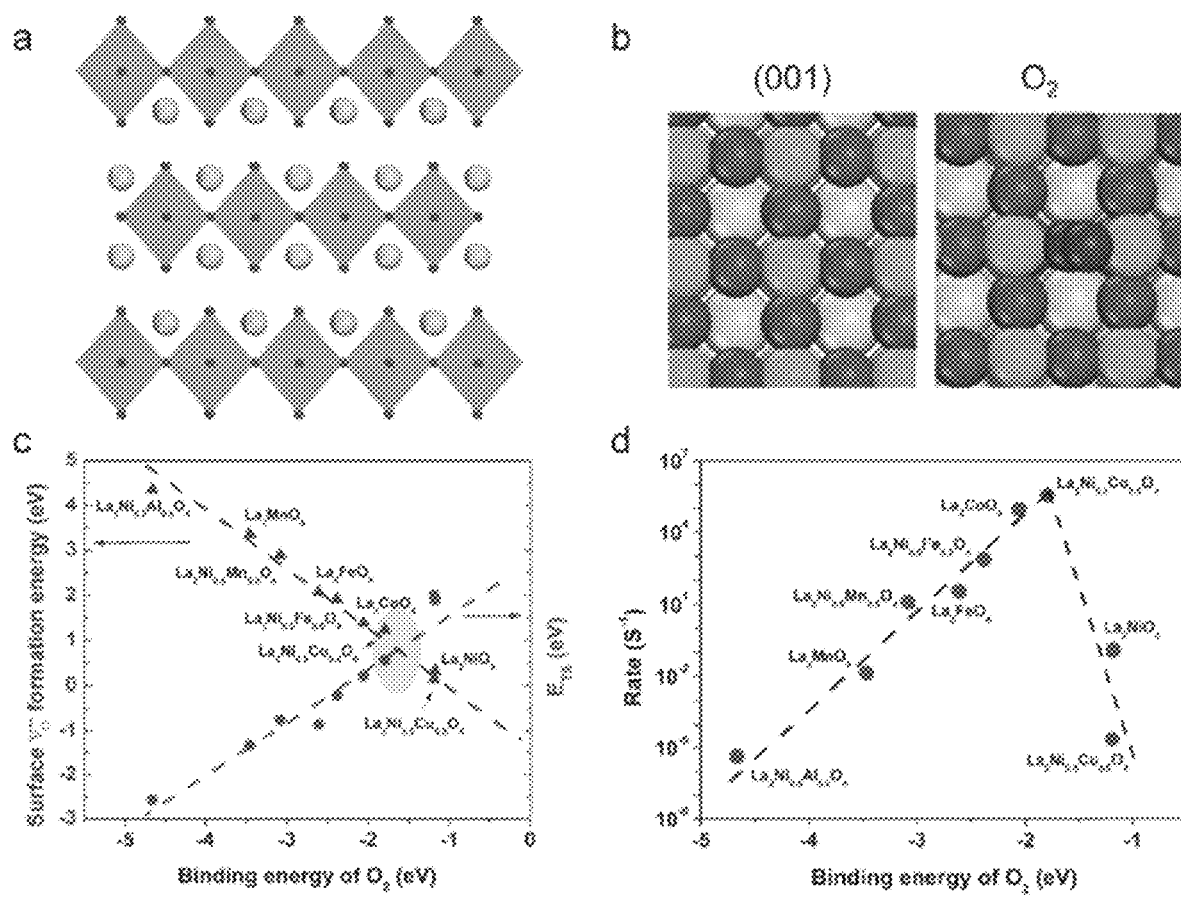

FIG. 7 illustrates DFT models and results in the form of a) Crystal structure of first-series R-P oxides. b) Structures of B-site terminated (001) surface and the $O_2$ binding at a surface oxygen vacancy. c) Energies of transition state for $O_2$ dissociation and surface oxygen vacancy formation as a function of $O_2$ binding energy on a surface oxygen vacancy. d) "Volcano" plot between the calculated rates for surface oxygen exchange and binding energy of $O_2$ on a surface oxygen vacancy at 500° C. and $O_2$ pressure of 0.21 atm. The cyan, green, purple, and red spheres represent La, B-site transition metal, O in $O_2$, and O atoms, respectively.

Figure 8:
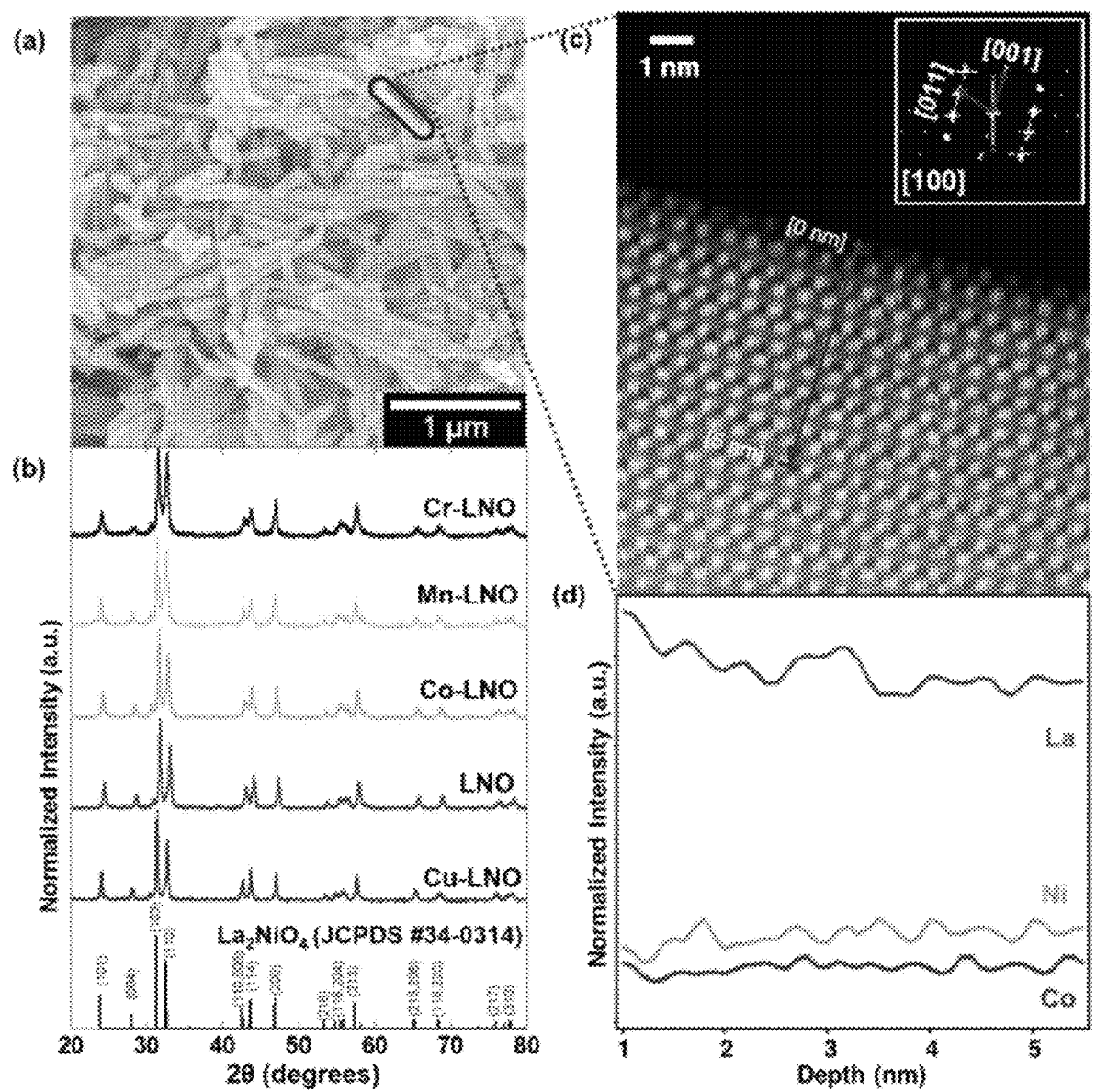

FIG. 8 is (a) SEM image of Co-LNO nanorods. (b) XRD spectra of the synthesized R-P oxides along with the reference pattern of bulk LNO standard. (c) Atomic resolution HAADF-STEM image of the surface of an individual Co-LNO nanorod. Inset of (c) is a Fast Fourier Transform (FFT) pattern indicating the [100] facet that is perpendicular to the exposed [001] surface facet. (d) EDS line scanning spectra of Co-LNO from the indicated line scan in (c).

Figure 9A:
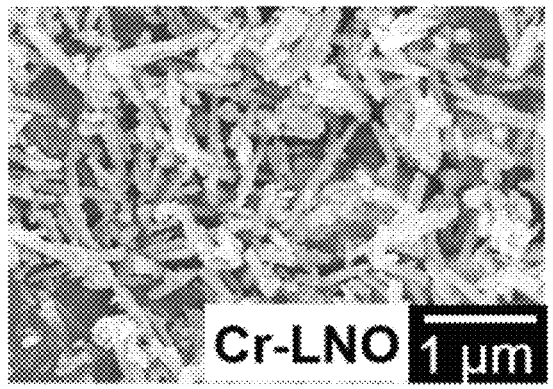
Figure 9A:
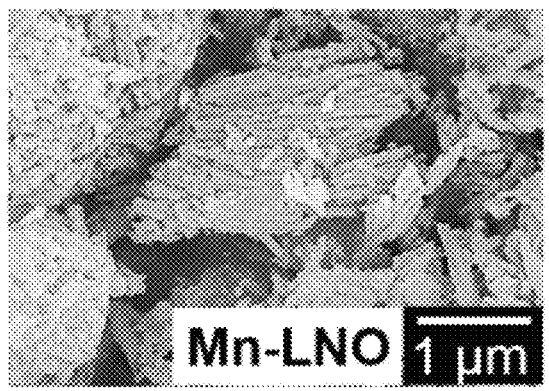
Figure 9A:
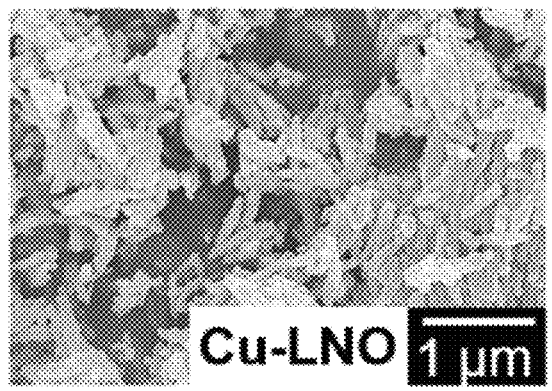
Figure 9A:
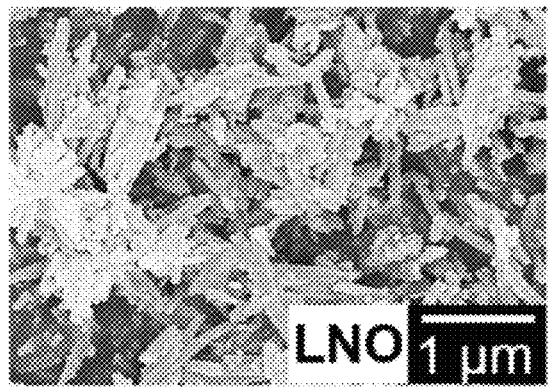
Figure 10:
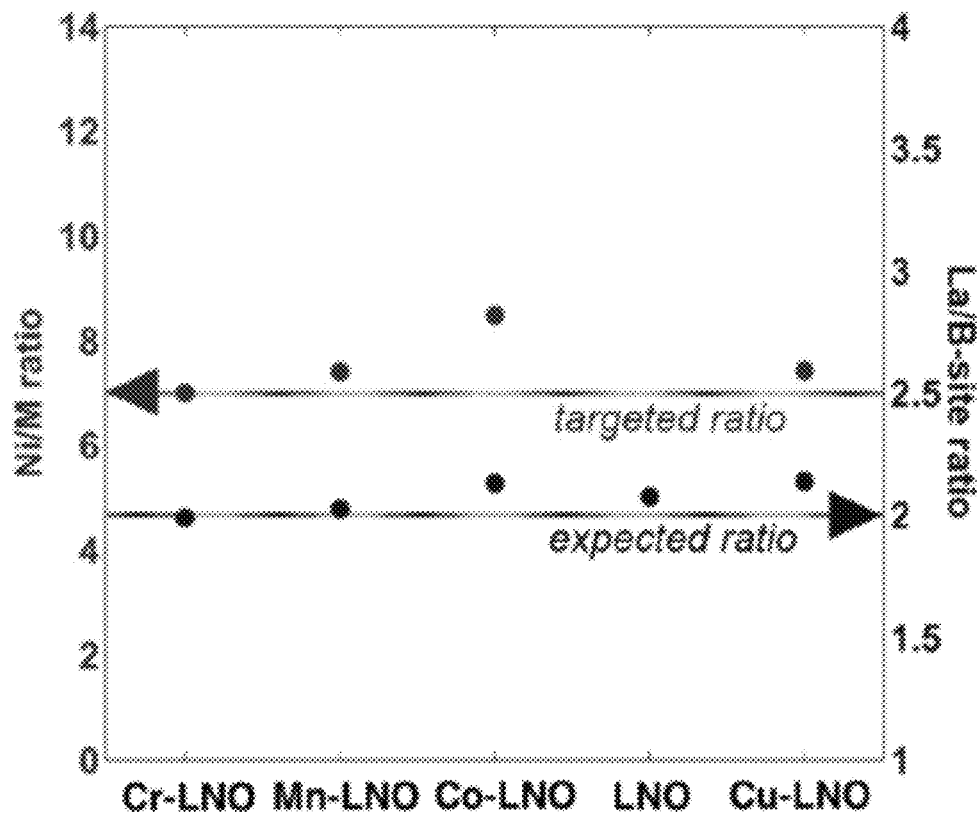
Figure 11:
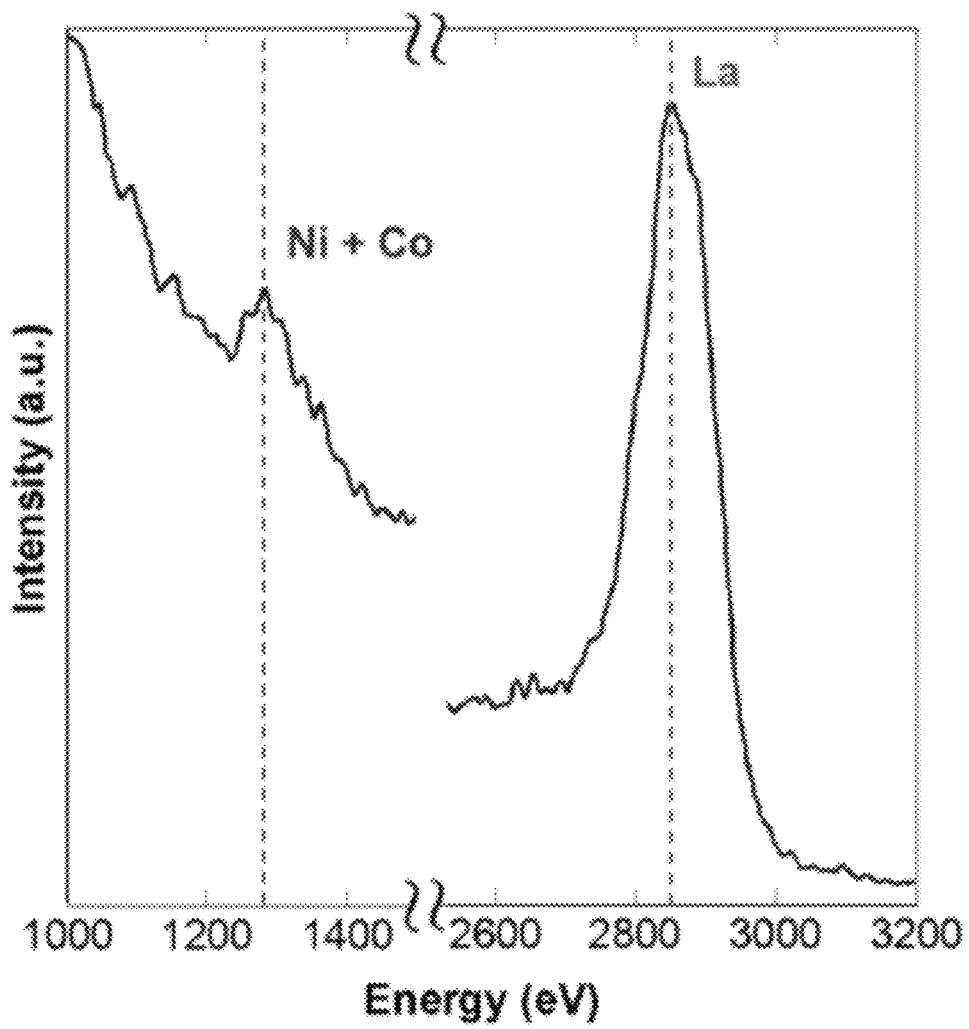
Figure 12:
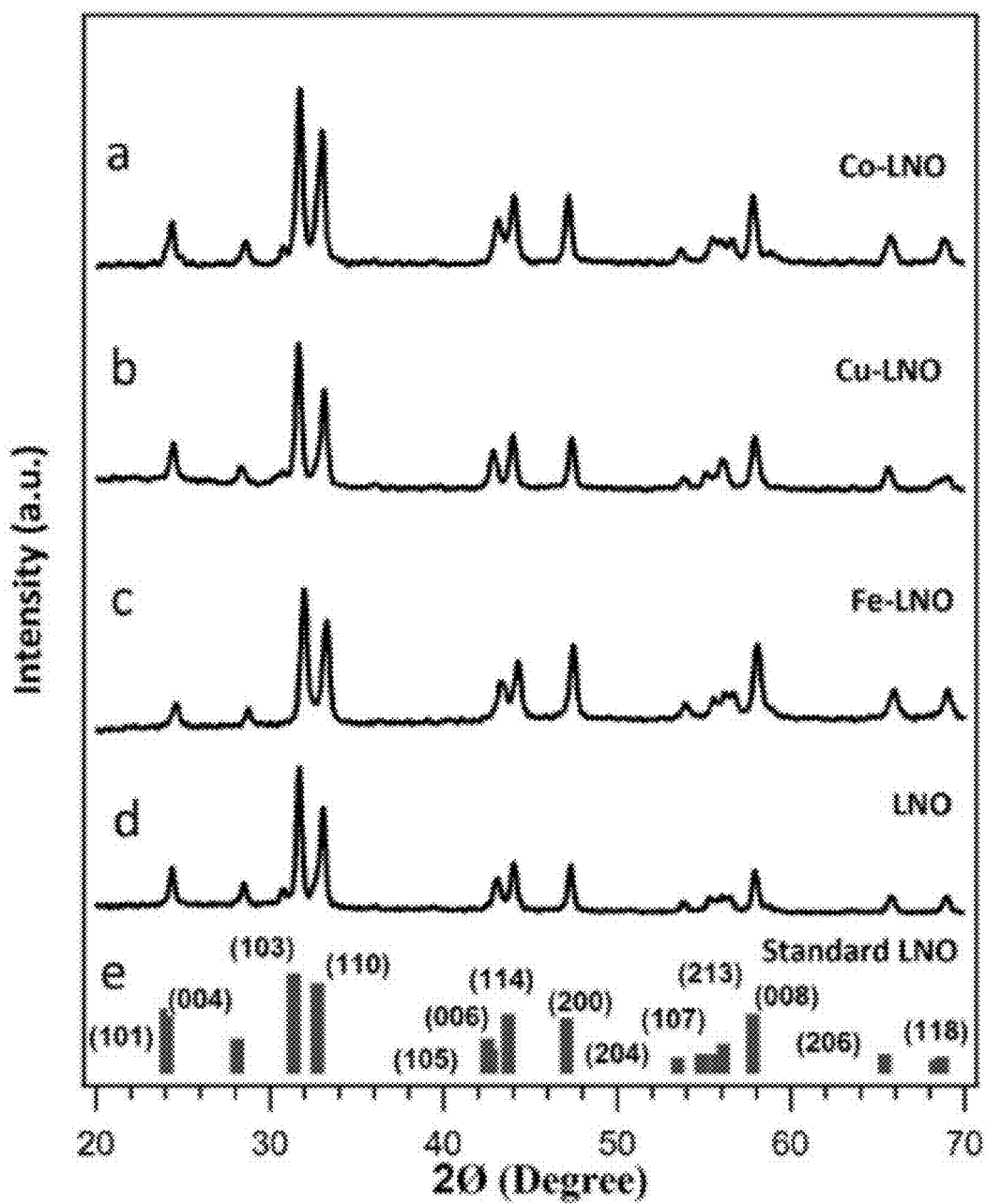

FIG. 9a shows SEM images of as-synthesized $La_2NiO_4$ (LNO), $La_2Ni_{0.88}Cu_{0.12}O_4$ (Cu-LNO), $La_2Ni_{0.88}Cr_{0.12}O_4$ (Cr-LNO), and $La_2Ni_{0.88}Mn_{0.12}O_4$ (Mn-LNO) nanostructures;

FIG. 9b provides a Table summarizing surface area normalization;

FIG. 10 represents an ICP analysis of the chemical composition of the R-P oxides plotted as Ni-to-M ratios (M=Cr, Mn, Co, Ni, and Cu) given by the upper row of scatter points, and A-site (La) to B-site ratios given by the lower row of scatter points;

FIG. 11 is an EELS spectrum for Co-LNO;

FIG. 12 is a powder XRD spectra for a) Co-LNO, b) Cu-LNO, c) Fe-LNO, d) LNO, and e) standard bulk LNO (JCPDS No. 34-0314). All XRD data here and thereafter are collected on a Bruker Phase II diffractometer with a Cu radiation source operating at 30 kV, 10 mA, and equipped with a LYNXEYE detector.

Figure 13:
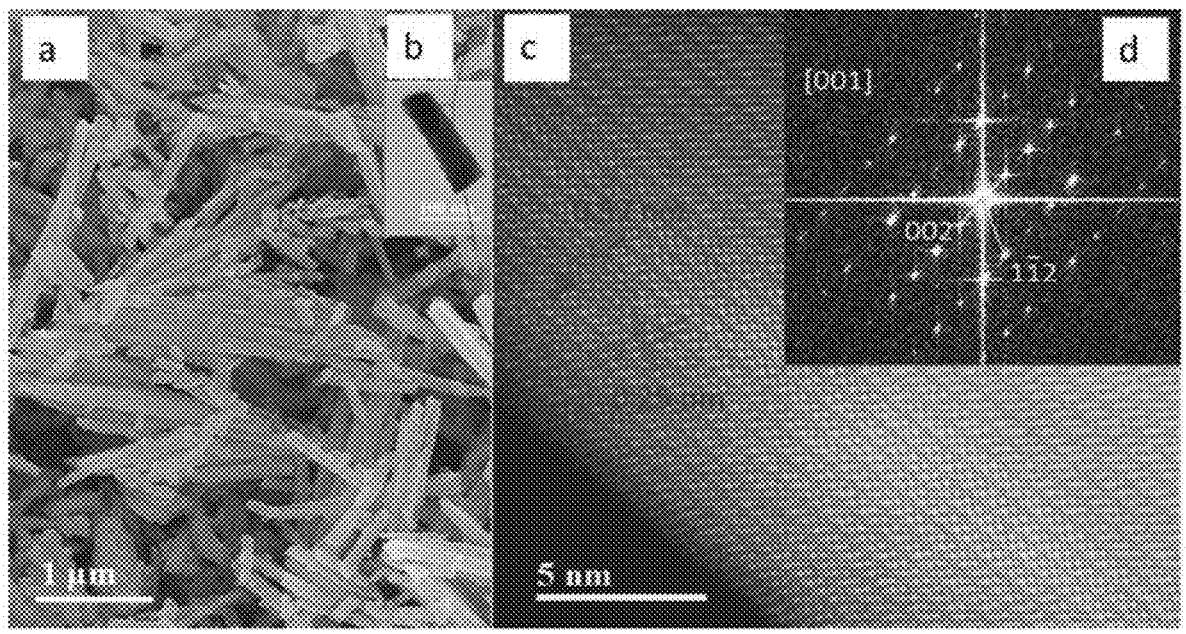

FIG. 13 illustrates nanostructures of Co-doped LNO in the form of (a) SEM image of the nanorod structures. (b) Bright-field STEM image of a typical nanorod. (c) HAADF-STEM image of nanorod surface from the area outlined by the red square in (b) showing continuous lattice fringes. (d) Corresponding Fast Fourier Transform pattern showing that Co-LNO nanorods with the (001) surfaces perpendicular to the projected zone axis, [110].

Figure 14:
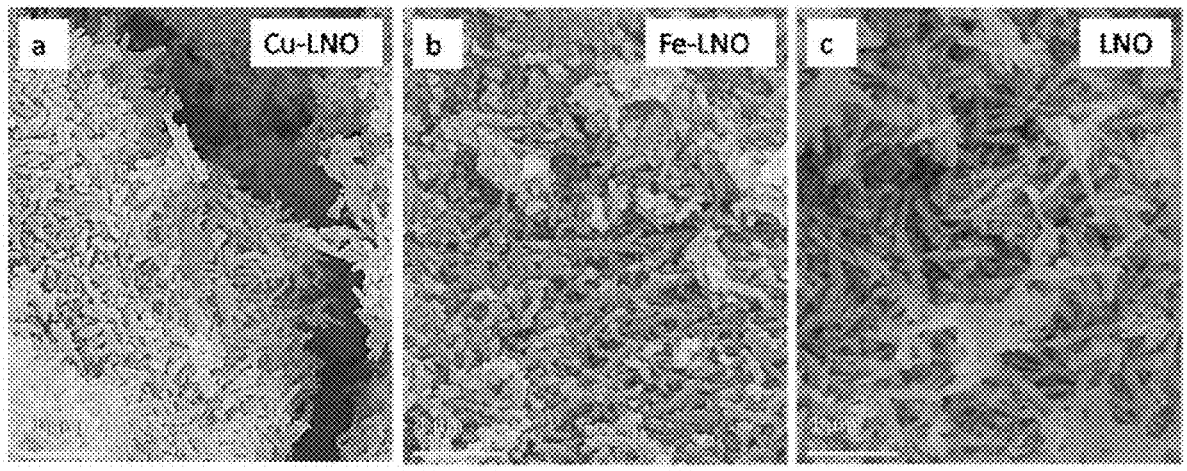

FIG. 14 represents SEM images of a) Cu-LNG, b) Fe-LNG, and c) LNG as synthesized. Similar to Co-LNG the figures show, uniform, nanorod morphologies are also observed for these oxides.

Figure 15:
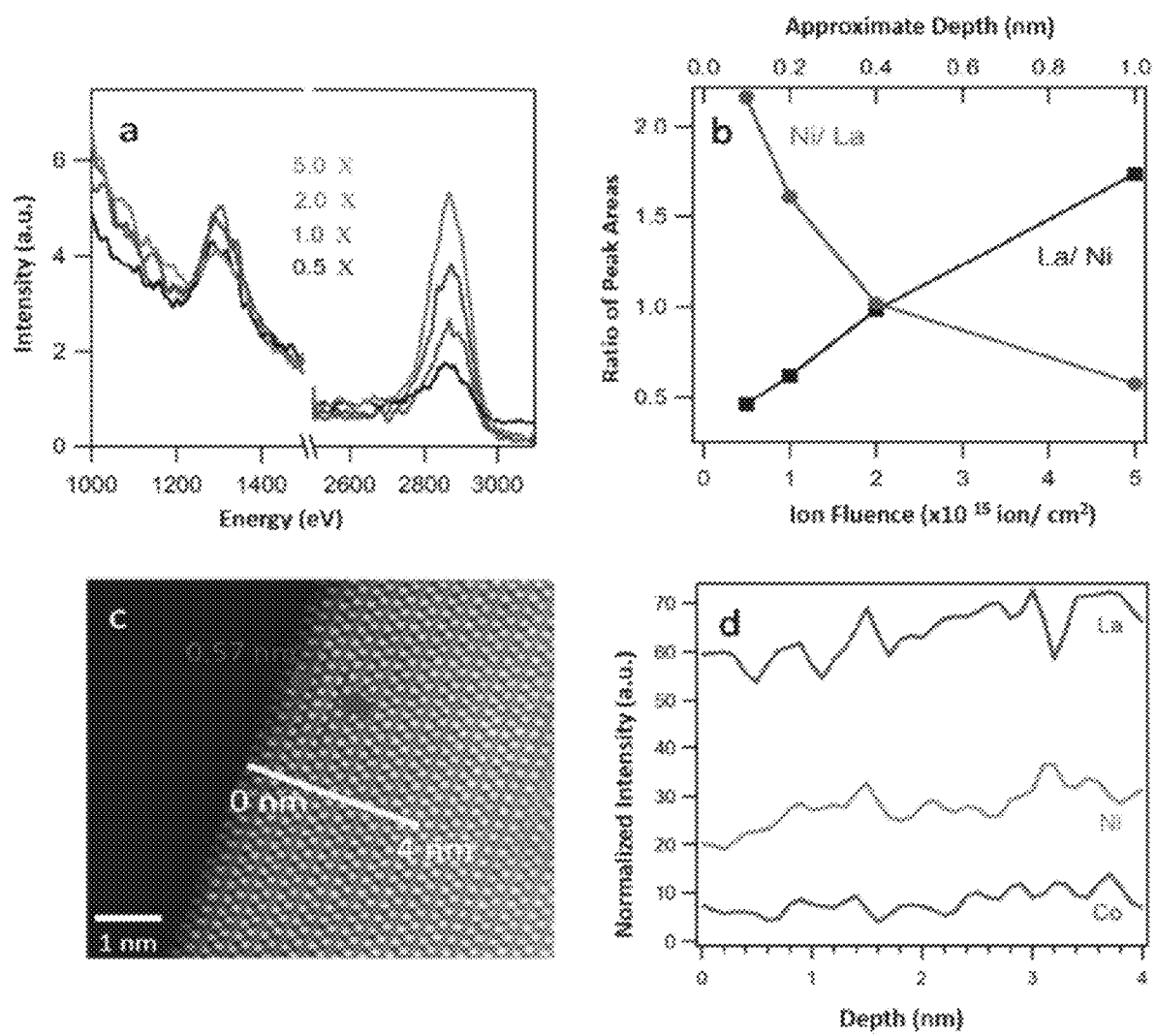

FIG. 15 illustrates surface characterization of nanostructured R-P oxides via (a) LEIS spectra of LNO after 0.5×, 1.0×. 2.0×, and 5.0× dose of 0.5 keV Ar$^+$, where X represents $1 \times 10^{15}$ ions/cm$^2$. (b) La/Ni and Ni/La ratios calculated from the area under the respective LEIS peaks as a function of penetration depth. (c) STEM of the surface of a typical Co-LNO nanorod showing the 4-nm line used for EDS line scanning. (d) The La, Ni and Co signals obtained from the line scanning in (c).

Figure 16:
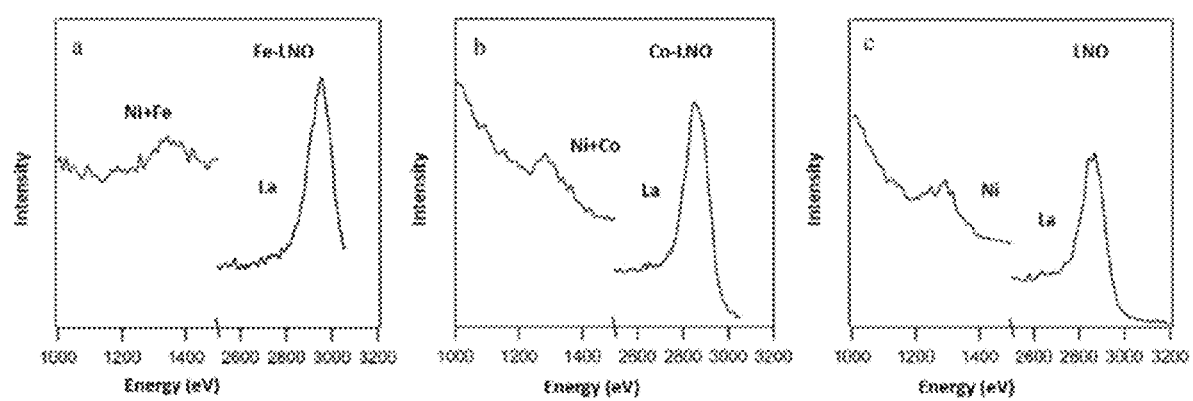

FIG. 16 represents LEIS spectra for a) Fe-LNO, b) Co-LNO, and c) LNO.

Figure 17:
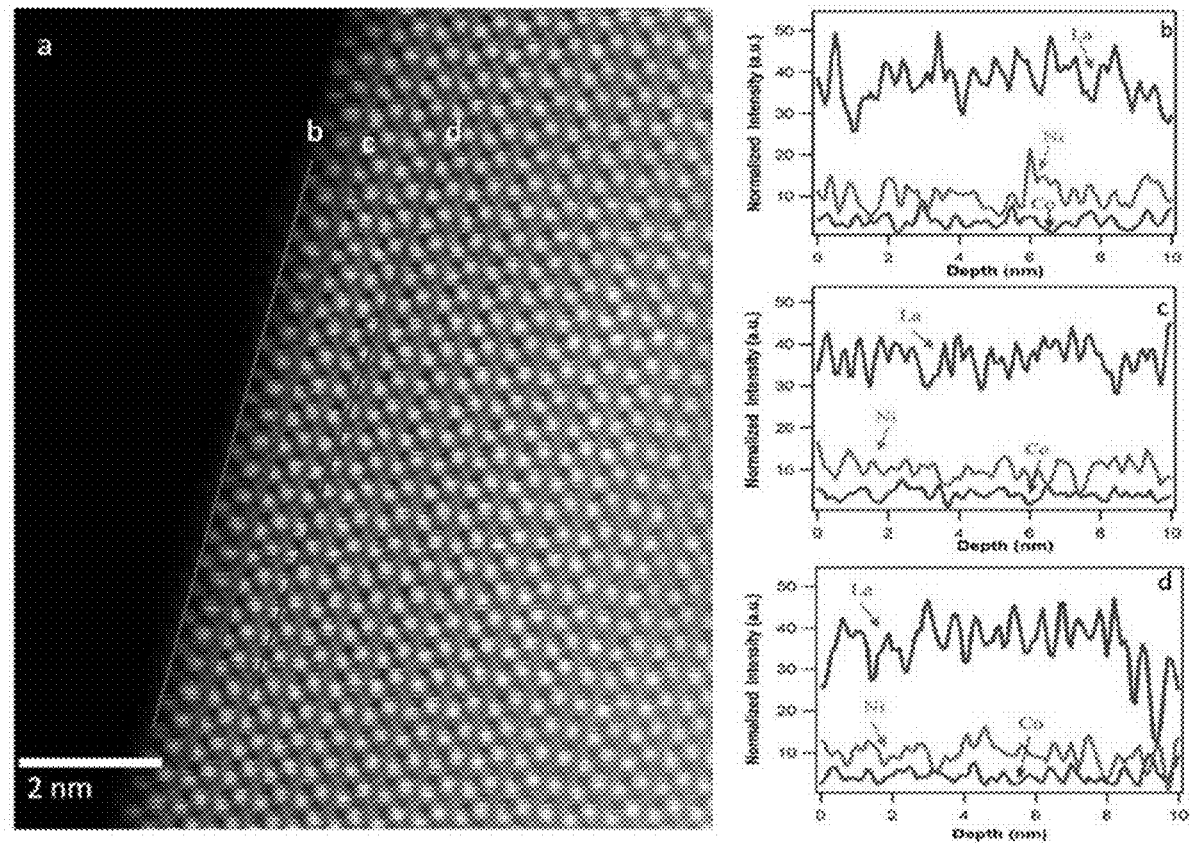

FIG. 17 demonstrates STEM/EDS characterization of Co-LNO nanorods for three different regions indicated by b, c, and d line scans. The HR-STEM image clearly shows the surface structure of Co-LNO nanorod with the layered R-P oxide structure. Three different line scans (b, c, and d) along the surface of the nanorod are conducted and the normalized intensities of La, Ni and Co are plotted on the right. Two observations can be obtained: (i) Ni and Co are both detected in the surface layer suggesting the B-site termination of the surface, and (ii) Co is uniformly distributed throughout the structure.

Figure 18:
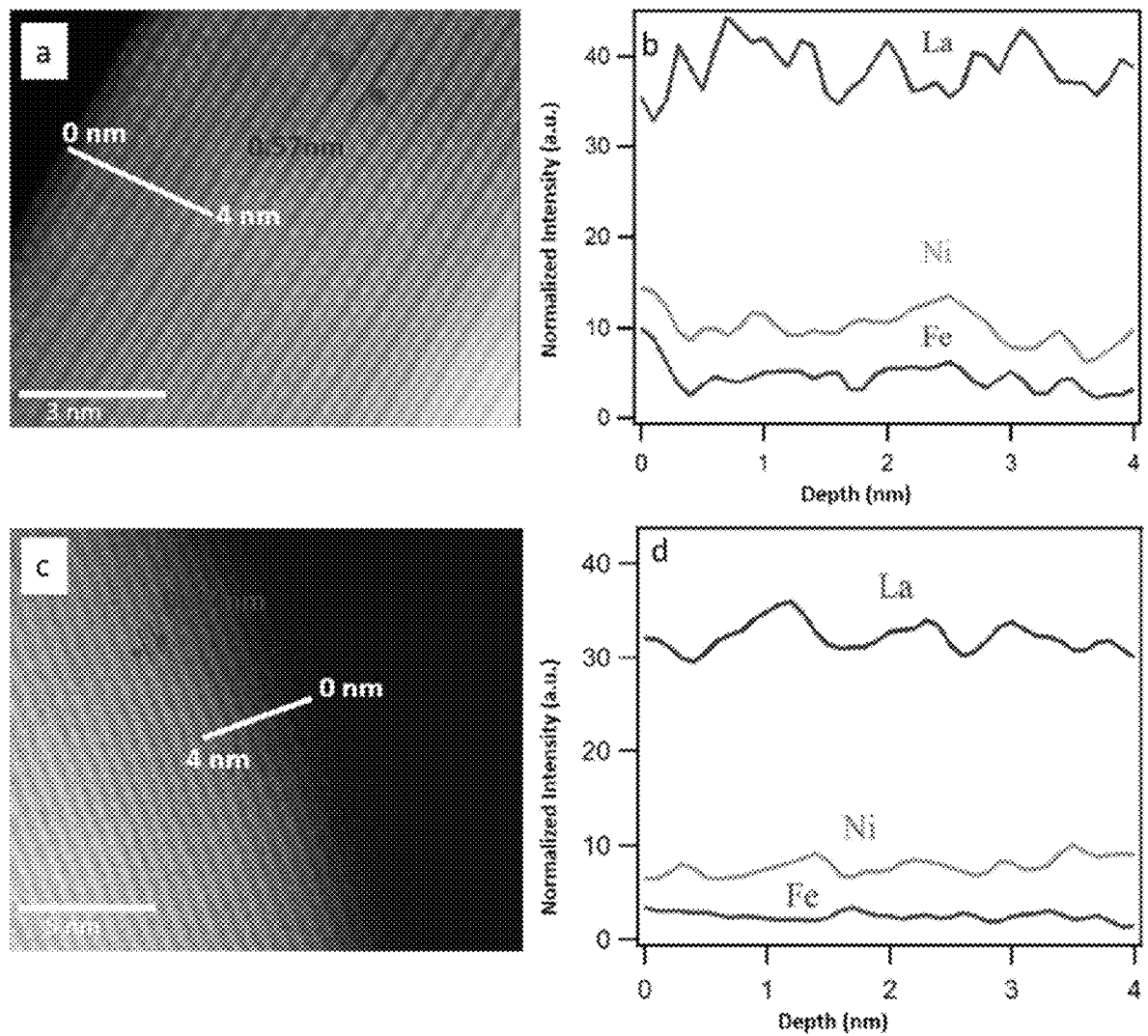

FIG. 18 represents pre- and post-reaction STEM/EDS characterization of Fe-LNO nanorods. a) STEM image of the as-synthesized Fe-LNO before the reaction along with the line used for EDS scanning. b) Normalized intensities of La, Ni, and Fe for the indicated EDS line scan in a. c) STEM image of Fe-LNO after the reaction and d) the elemental distribution along the EDS line scan in c.

Figure 19:
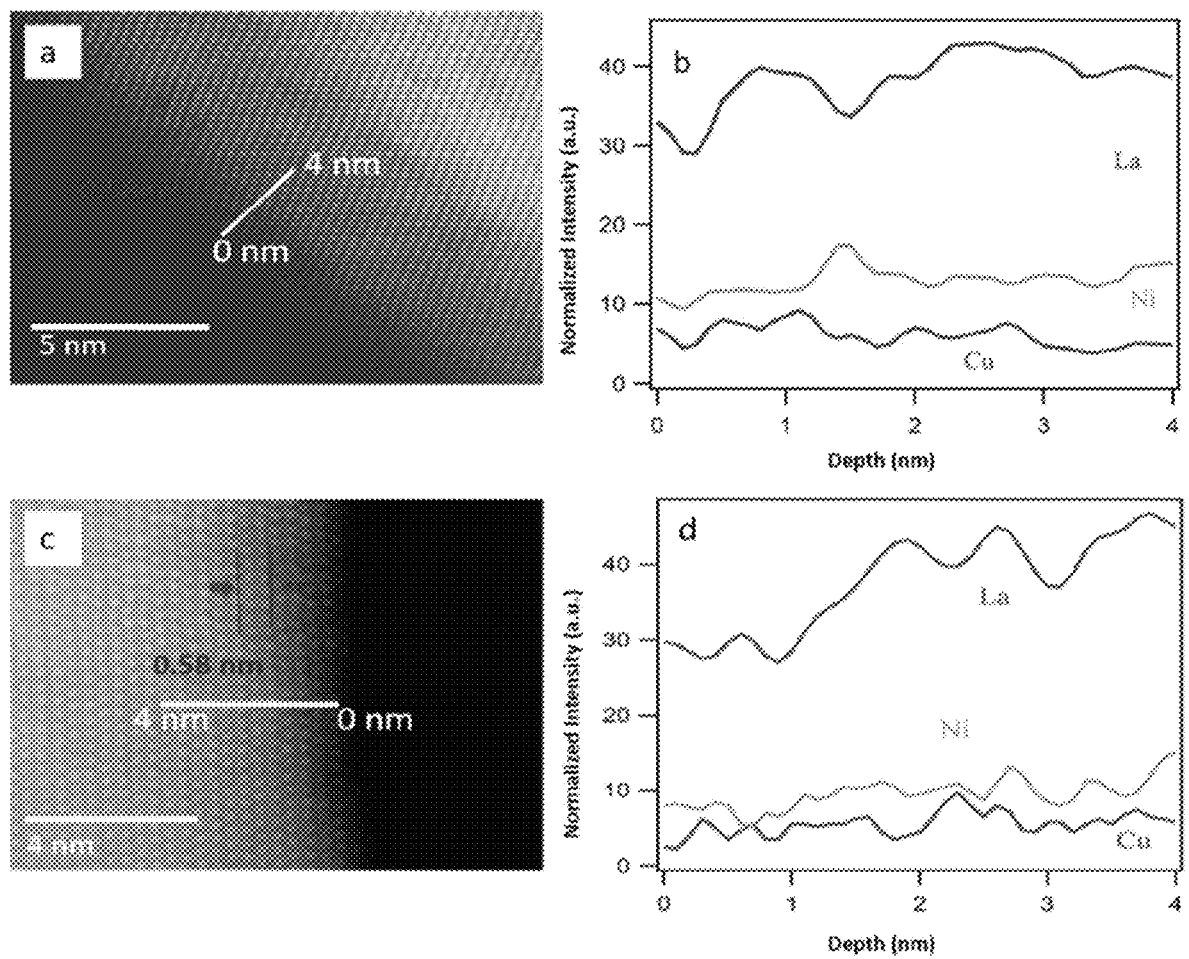

FIG. 19 represents pre- and post-reaction STEM/EDS characterization of Cu-LNG nanorods. a) STEM image of the as-synthesized Cu-LNG before the reaction along with the line used for EDS scanning. b) Normalized intensities of La, Ni, and Cu for the indicated EDS line scan in a. c) STEM image of Cu-LNG after the reaction and d) the elemental distribution along the EDS line scan in c.

Figure 20:
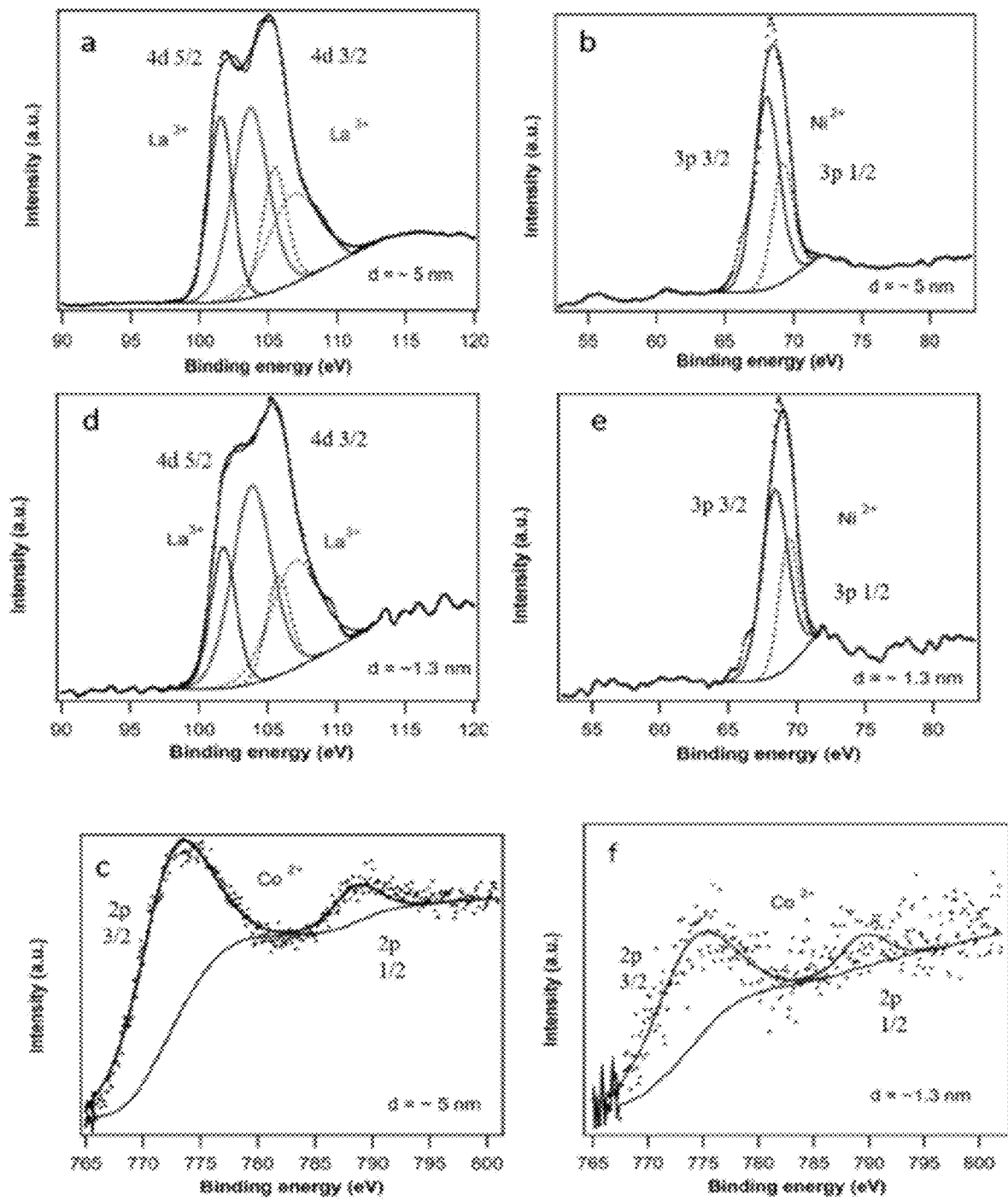

FIG. 20 includes AR-XPS spectra of La, Ni, and Co for Co-LNO collected at 0° and 80° tilt angles with respect to normal surface at 0°. The corresponding detected depths are ~5.0 and 1.3 nm, calculated. The solid lines represent 4d 5/2, 3p 3/2, and 2p 3/2, while the dotted lines represent 4d 3/2, 3p 1/2, and 2p 1/2 for La, Ni, and Co, respectively. La spectra (a & d) show two different peaks due to spin orbit coupling. The observed oxidation states of La3+, Ni2+, and C02+ at both depths are consistent with that in the R-P structure, suggesting that Co dopants are uniformly distributed in Co-LNO without reconstructing at the near surface, contrary the reported near-surface reconstruction for other R-P oxides.

Figure 21:
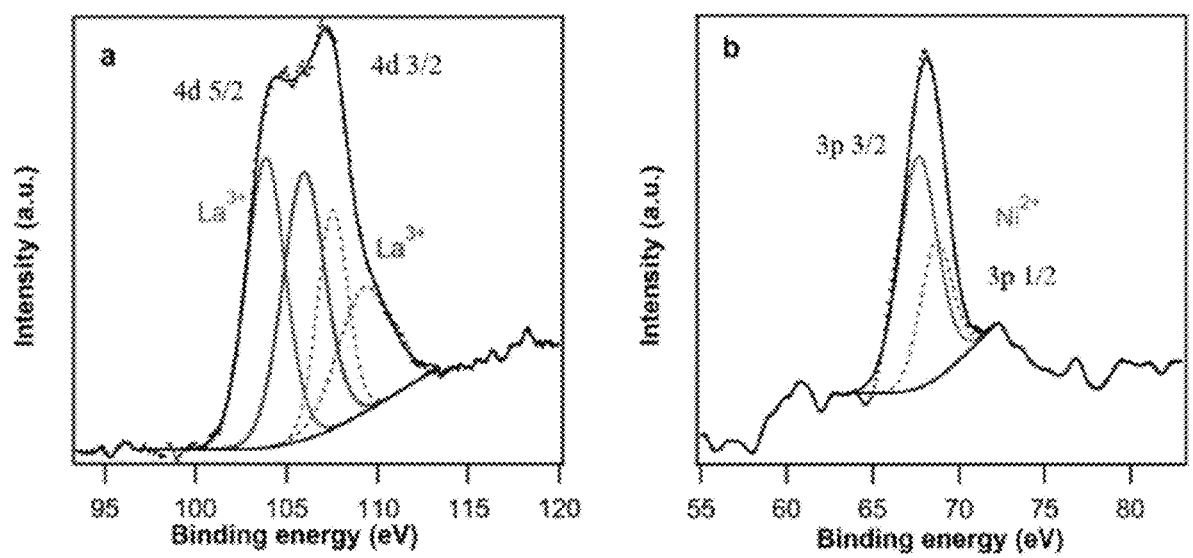

FIG. 21 shows XPS spectra of La and Ni for LNG. The solid lines represent 4d 5/2 (La) and 3p ½ (Ni), while the dotted lines represent 4d 3/2 (La) and 3p 3/2 (Ni). The two different peaks for La spectra stem from the spin orbit coupling (9). The oxidation states of La3+ and Ni2+ are consistent with that in the R-P structure.

FIG. 22 is a table demonstrating measured surface areas of catalysts using N2 physisorption.

Figure 23:
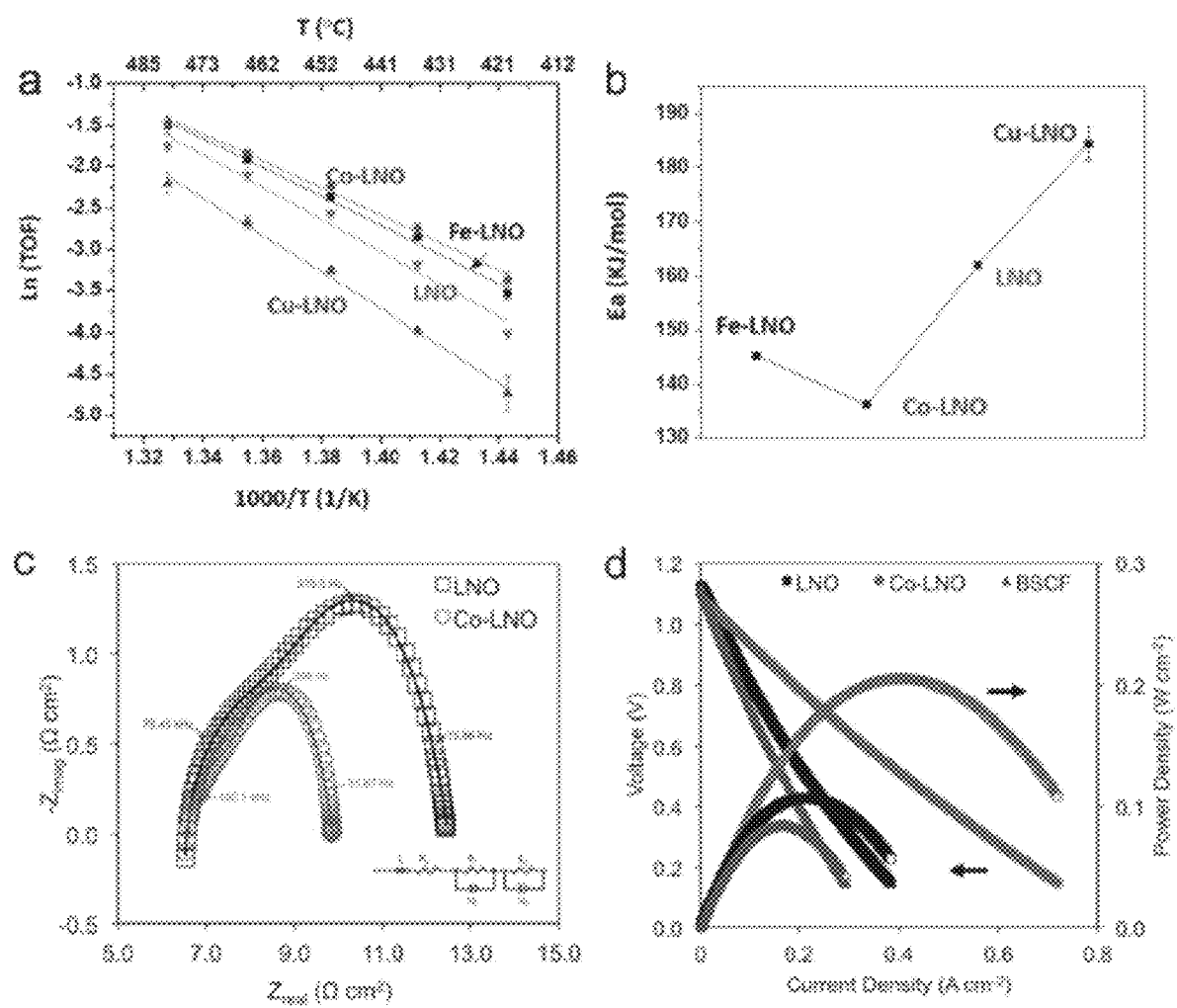

FIG. 23 demonstrates the performance of surface oxygen exchange and electrochemical oxygen reduction using (a) Arrhenius plots obtained from the thermochemical surface oxygen exchange kinetics. (b) Apparent activation barriers for surface oxygen exchange. The error bars are obtained based on the data from three independent measurements for each catalyst. (c) Impedance spectra for R-P oxides-YSZ|YSZ|YSZ-R-P oxides symmetric cells operating at pO$_2$=1 atm and 550° C. (d) Electrochemical performance of SOFCs containing LNO nanorods, Co-LNO nanorods, and Ba$_{0.5}$Sr$_{0.5}$Co$_{0.5}$Fe$_{0.2}$ (BSCF) at 550° C.

Figure 24:
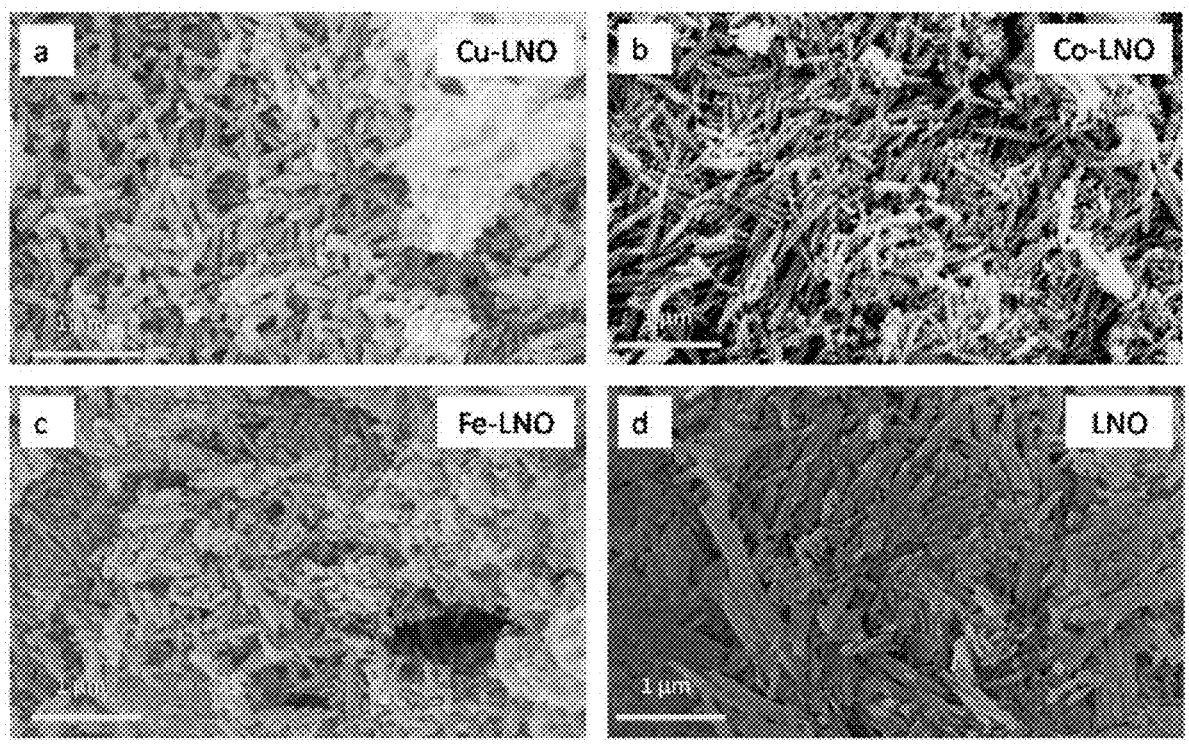

FIG. 24 provides post-reaction SEM images of a) Cu-LNG, b) Co-LNG, c) Fe-LNG, and d) LNG nanorods.

Figure 25:
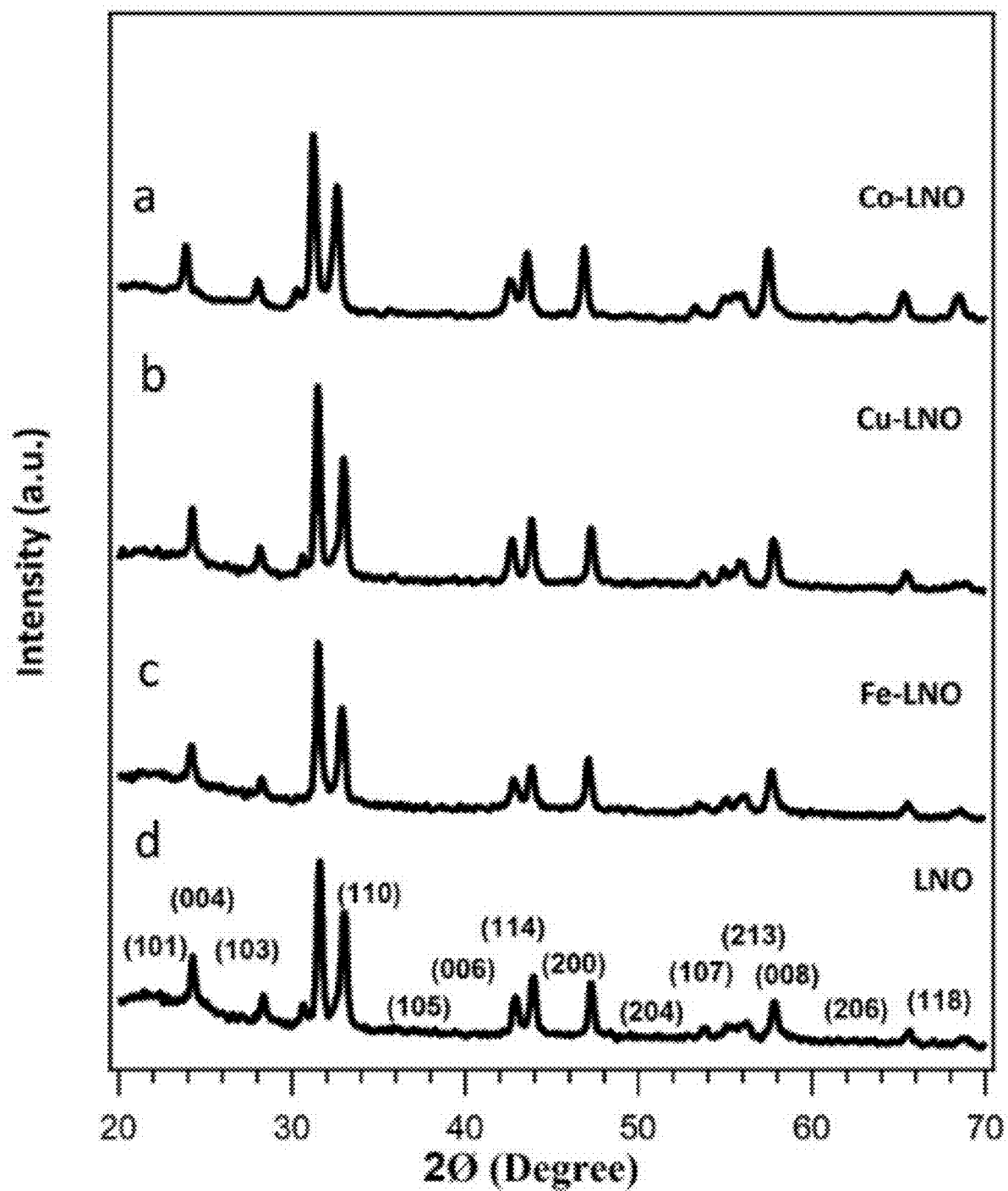

FIG. 25 demonstrates Post-reaction XRD characterization of a) Co-LNO, b) Cu-LNO, c) Fe-LNO, and d) LNO.

Figure 26:
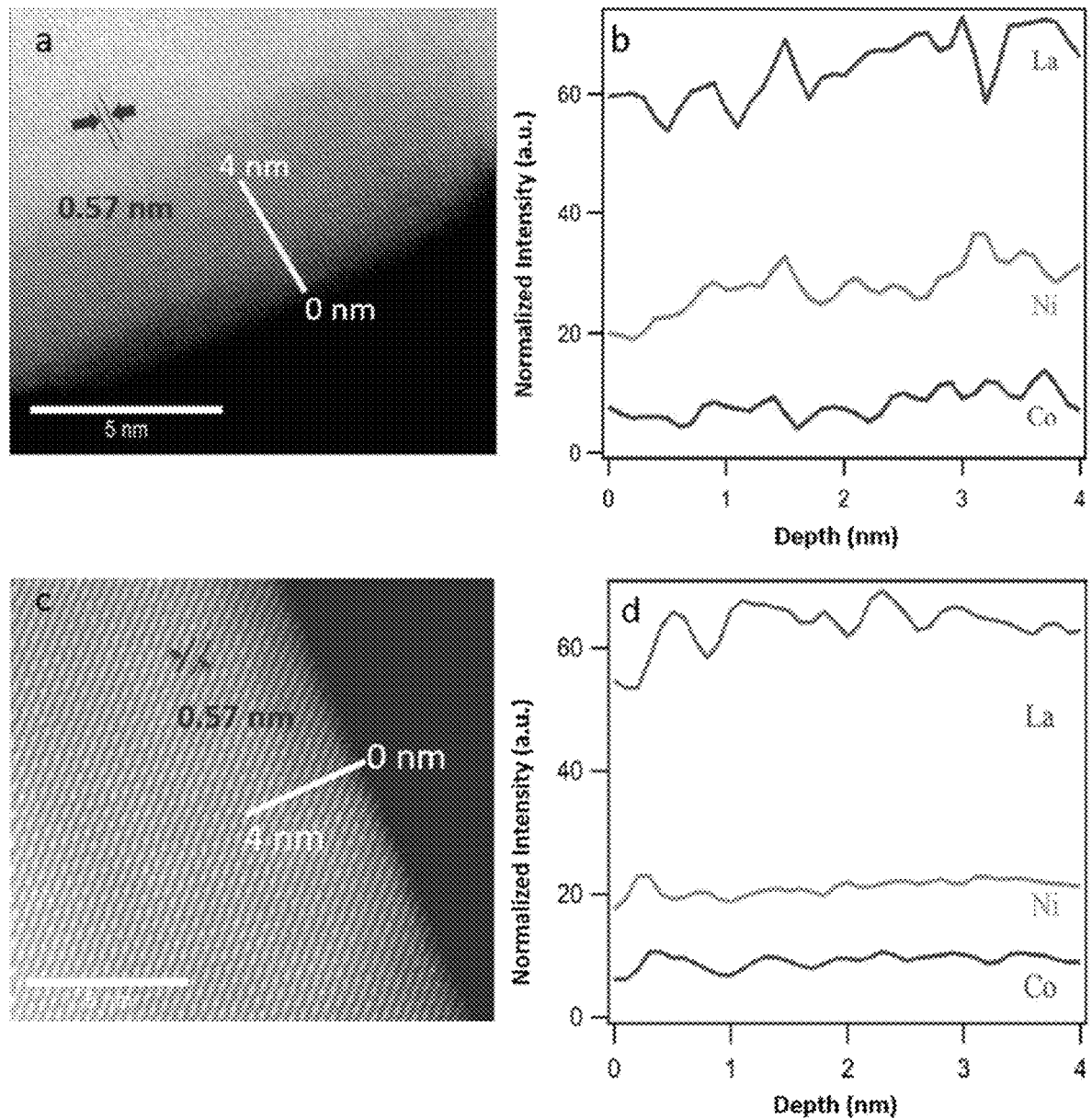

FIG. 26 illustrates pre- and post-reaction STEM/EDS characterization of Co-LNG nanorods. a) STEM image of the as-synthesized Co-LNG before the reaction along with the line used for EDS scanning. b) Normalized intensities of La, Ni, and Co for the indicated EDS line scan in a. c) STEM image of Co-LNG after the reaction and d) the elemental distribution along the EDS line scan in c.

Figure 27:
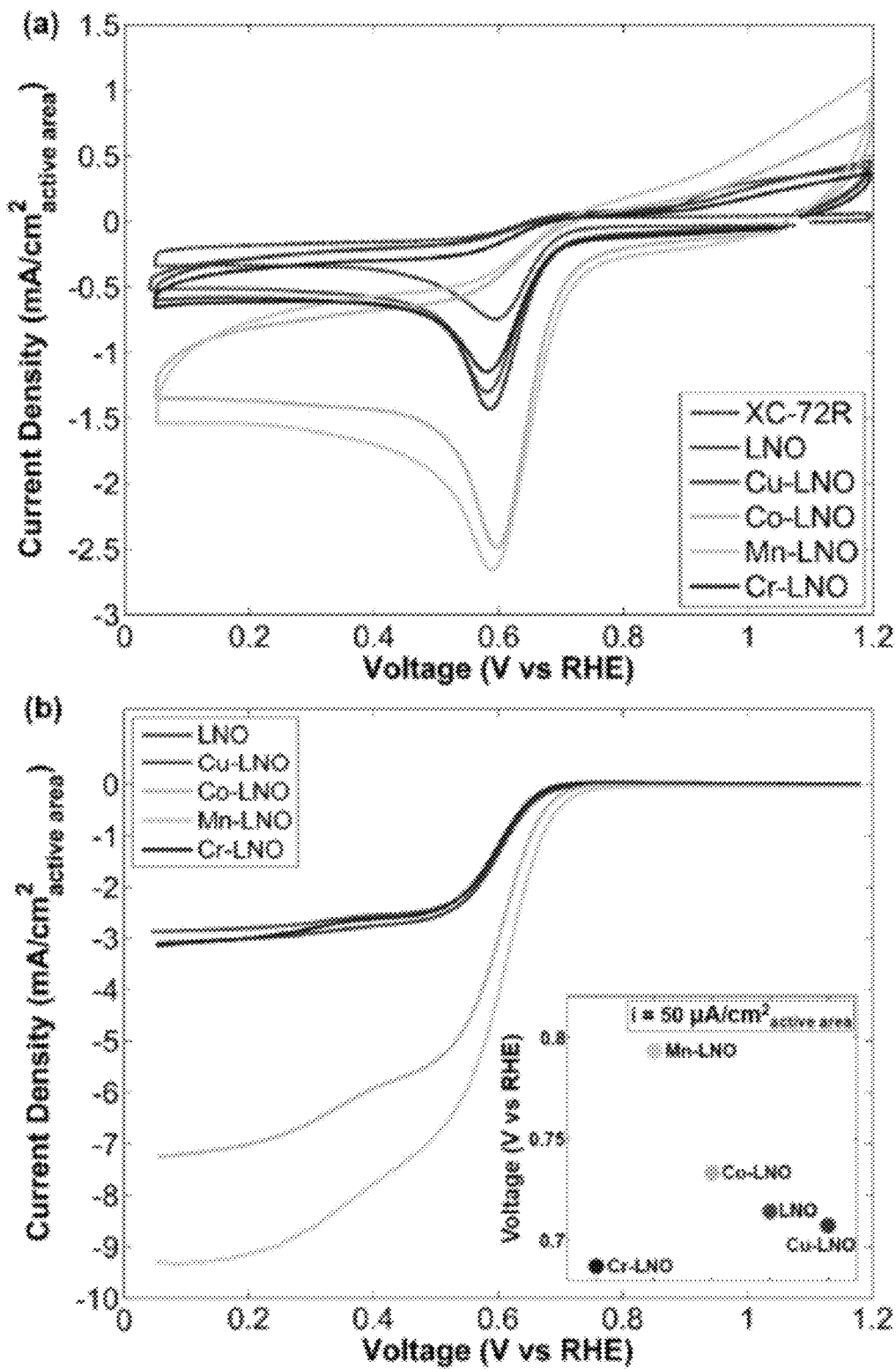

FIG. 27 represents (a) cyclic voltammograms (CVs) of the R-P oxides in Ar-saturated 0.1 M KOH electrolyte using 50 mV/s scan rate. (b) CVs of the R-P oxides and carbon (dashed curve) in O$_2$-saturated 0.1 M KOH electrolyte using 50 mV/s scan rate.

Figure 28:
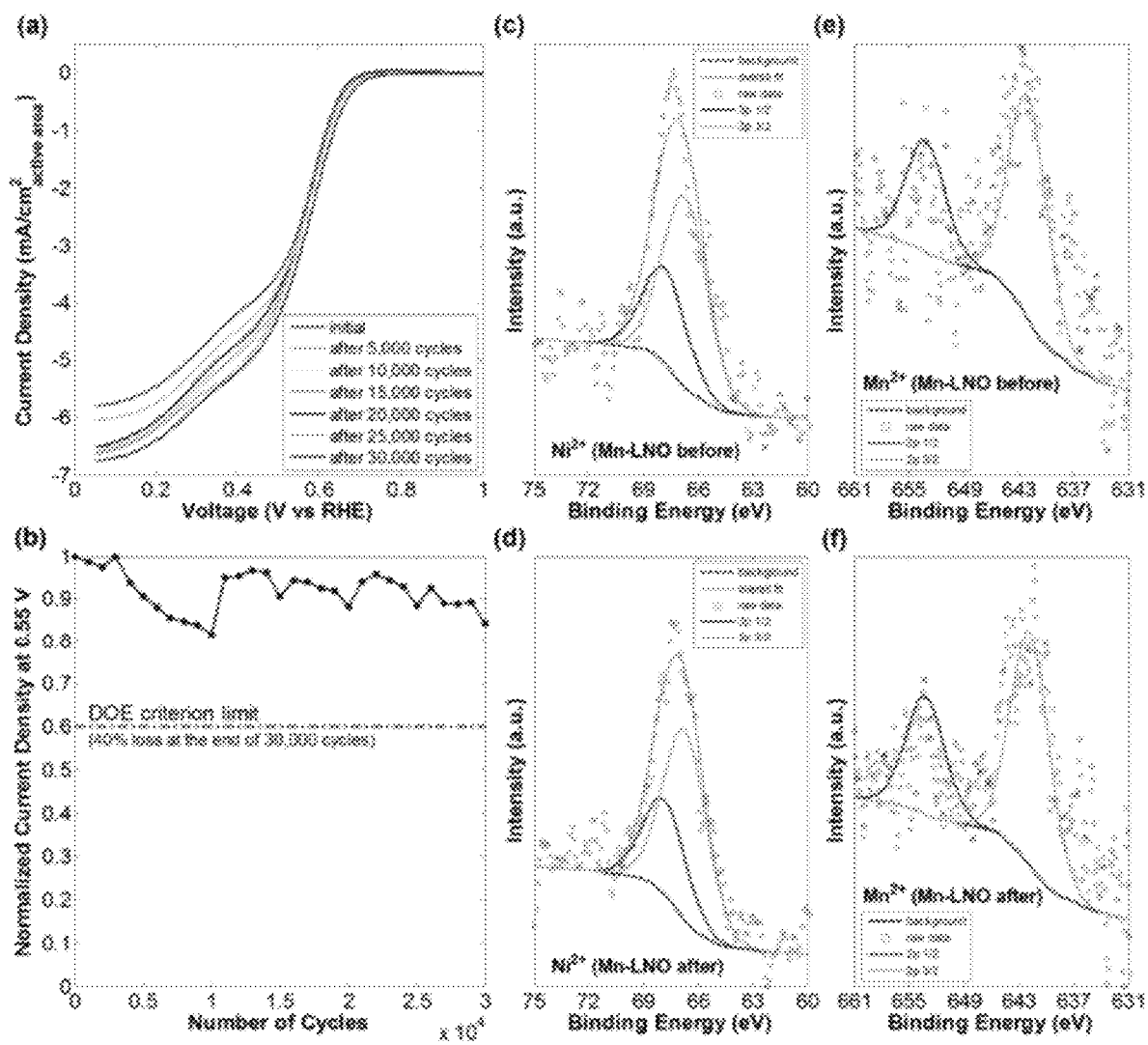

FIG. 28 represents (a) Rotating ring-disk voltammograms of the oxide thin-films in O$_2$-saturated 0.1 M KOH at 10 mV/s scan rate and a rotation speed of 1600 rpm. (b) Onset potentials of the oxides as a function of the B-site composition.

Figure 29:
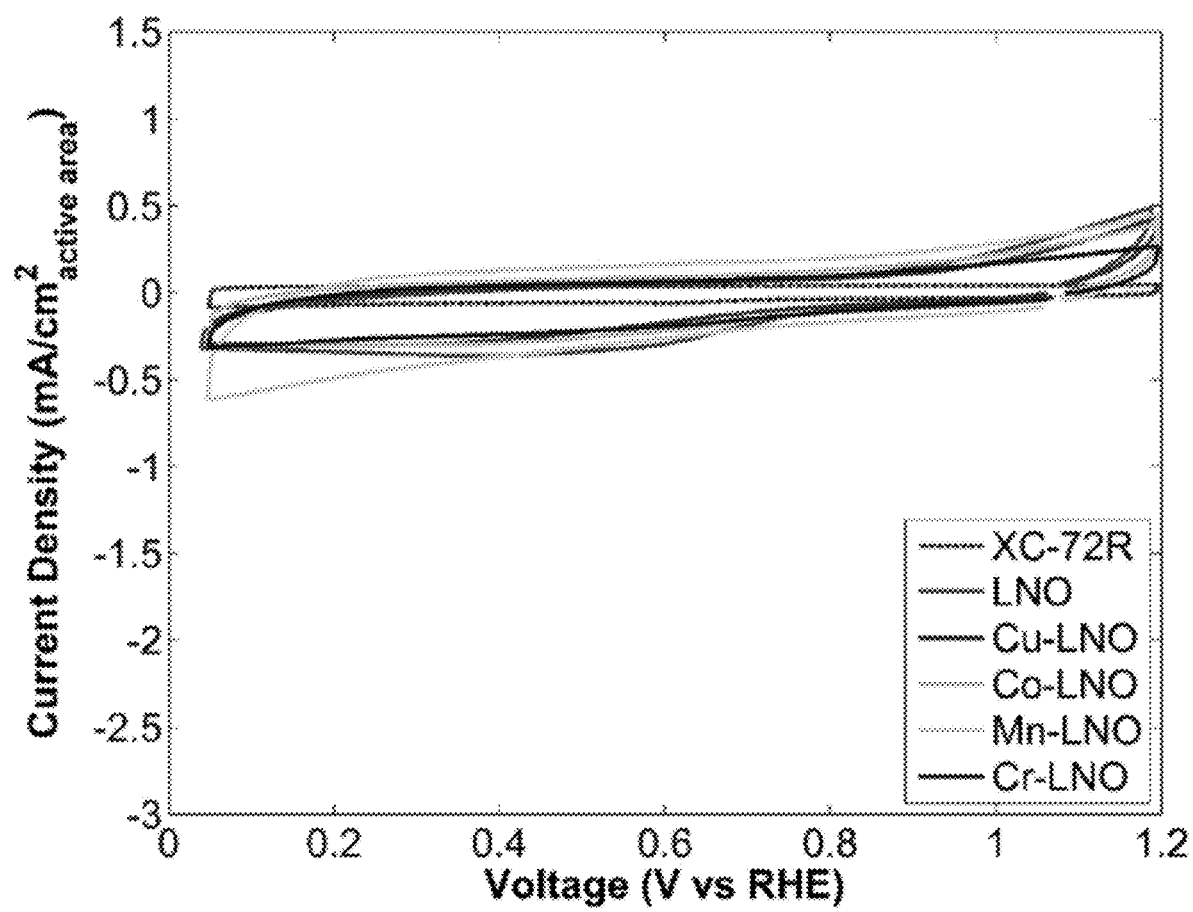

FIG. 29 includes active area normalized cyclic voltammograms (CVs) of the R-P oxides in Ar-saturated 0.1 M KOH electrolyte using 50 mV/s scan rate.

Figure 30:
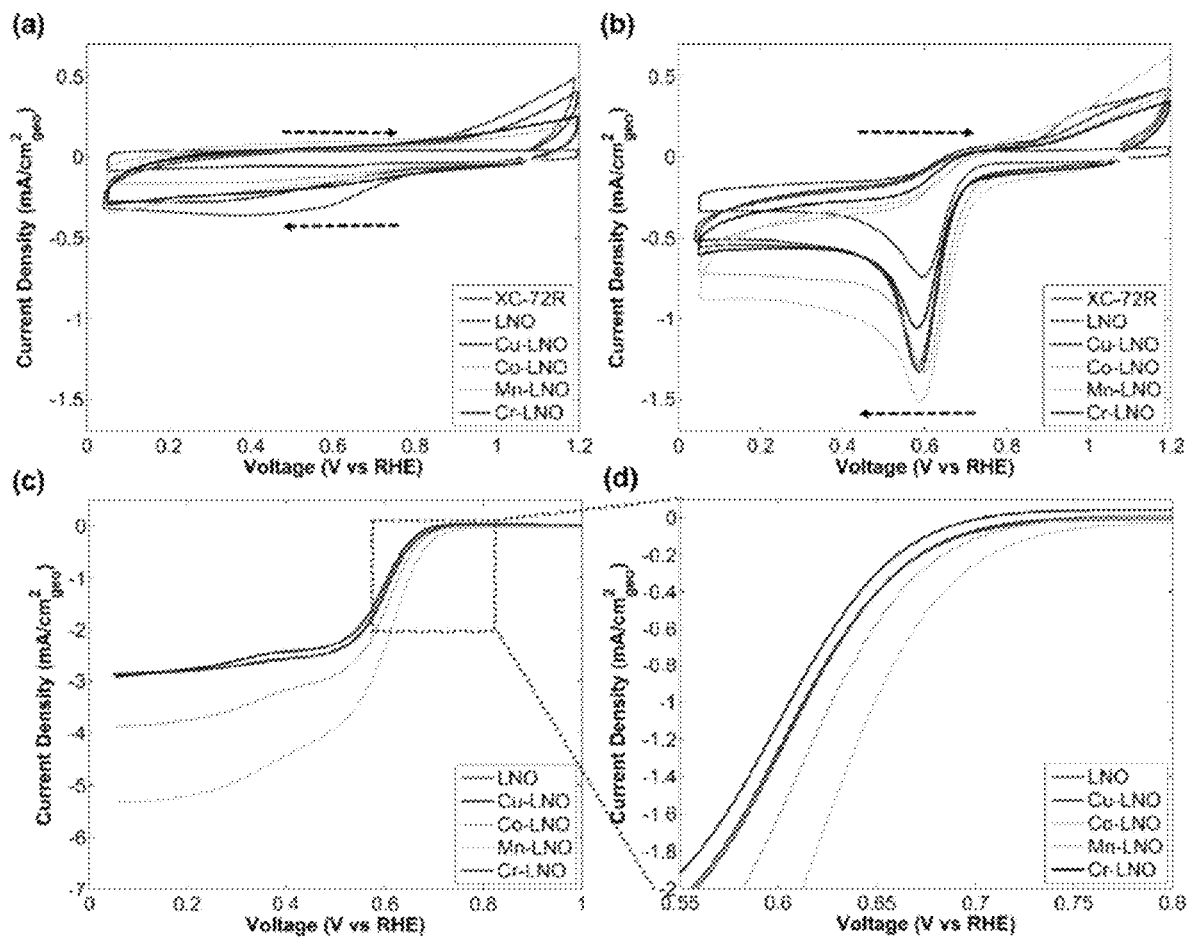

FIG. 30 illustrates electrochemical performances normalized using the geometric area of electrode. (a) Cyclic voltammograms (CVs) of the R-P oxides in Ar-saturated 0.1 M KOH electrolyte using 50 mV/s scan rate. (b) CVs of the R-P oxides and carbon (dashed curve) in O2-saturated 0.1 M KOH electrolyte using 50 mV/s scan rate. The arrows in (a) and (b) indicate the scan direction. (c) Rotating ring-disk voltammograms of the oxide thin-films in O2-saturated 0.1 M KOH at 10 mV/s scan rate and 1600 rpm rotation speed. (d) Zoomed-in view of the boxed region shown in (c).

Figure 31:
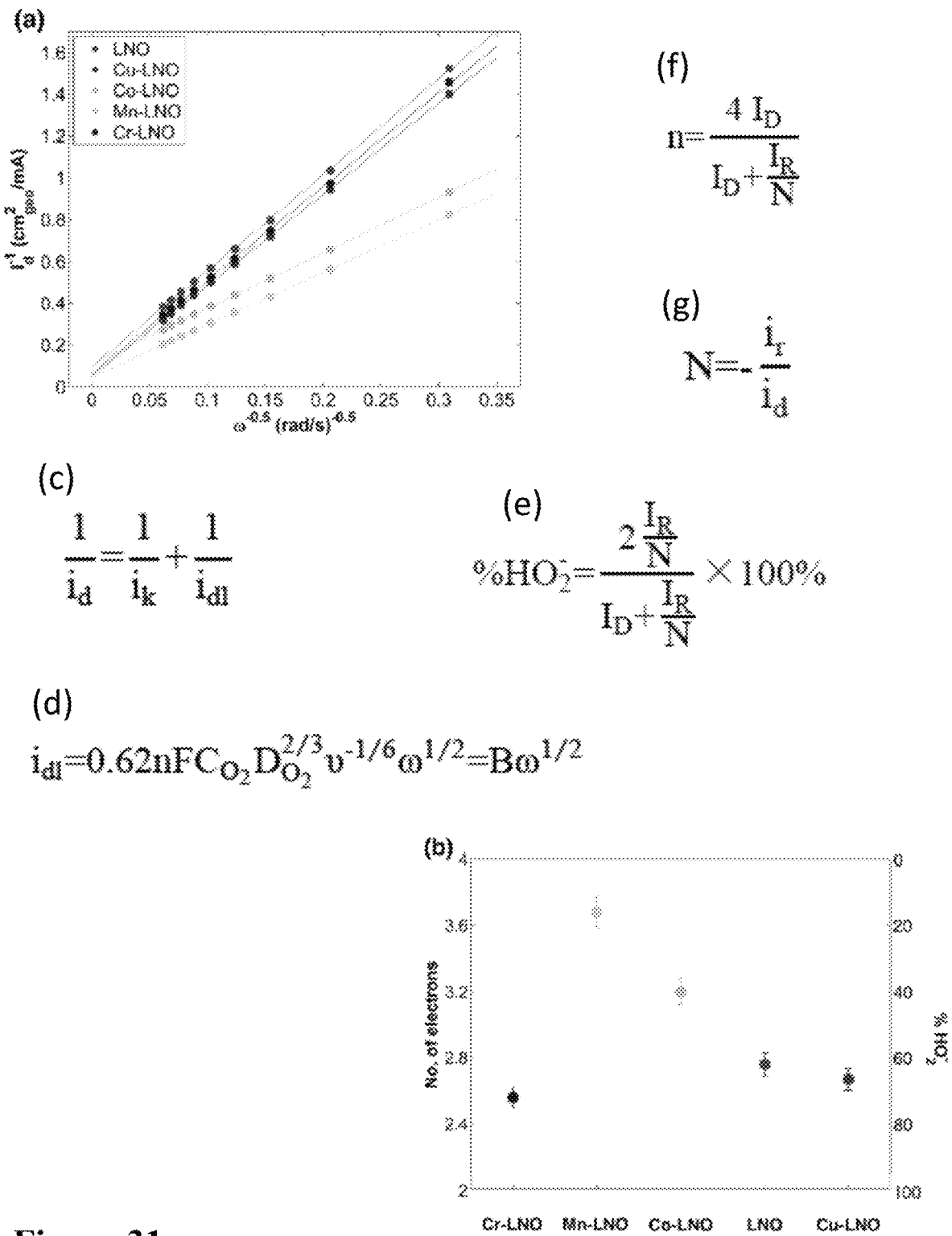

FIG. 31 represents (a) Koutecky-Levich (K-L) plots of the oxides calculated at 0.4 V (vs RHE). (b) Number of electrons transferred and hydrogen peroxide formation during ORR calculated at the same potential; (c) K-L equation for current generated; (d) K-L equation for kinetic current density; (e) equation used to calculate hydroperoxide generated; (f) equation used to calculate number of electrons from a ring-electrode; (g) equation used to determine current generated on disk electrode.

Figure 32:
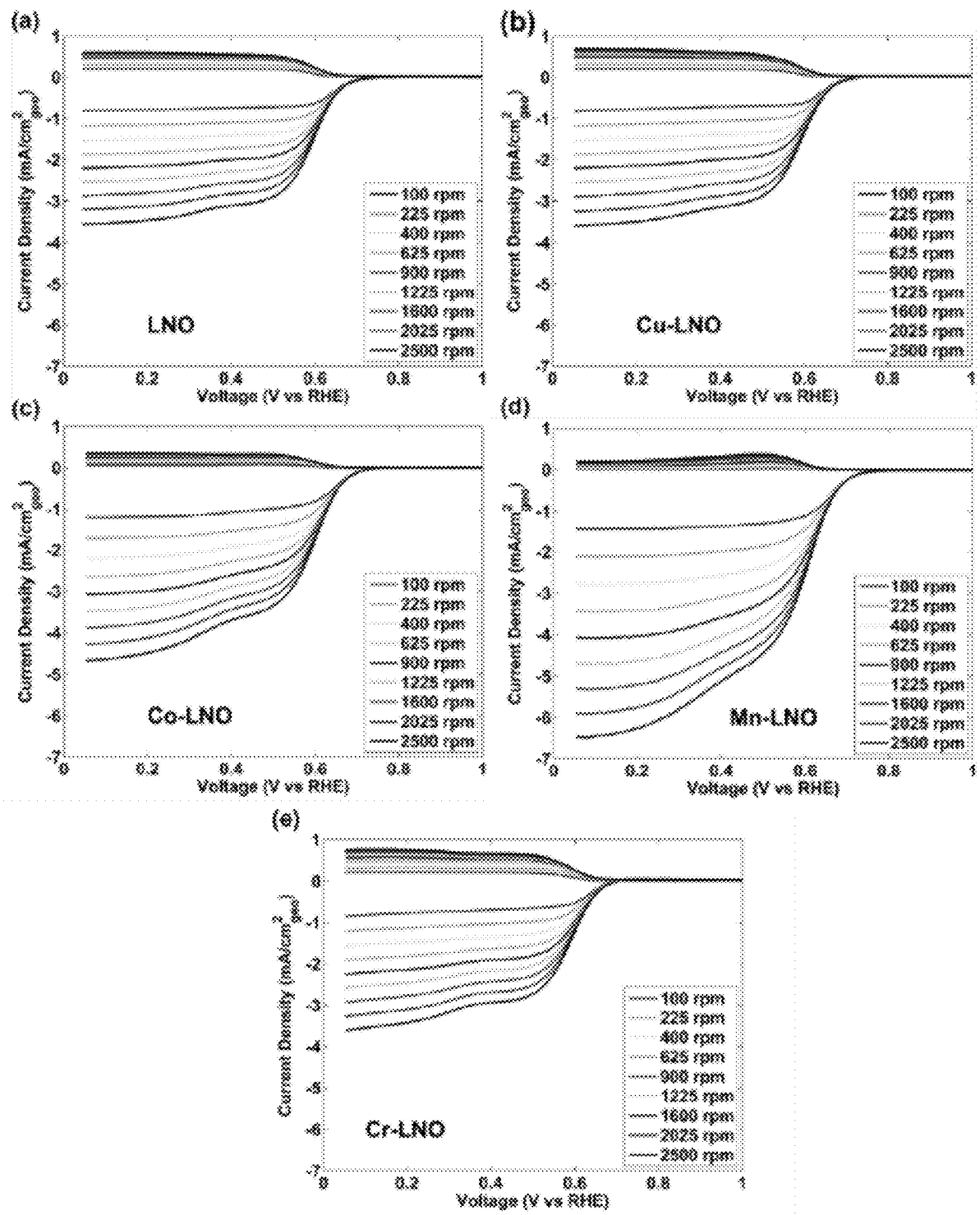

FIG. 32 illustrates rotating Ring-Disk voltammograms of the R-P oxides deposited on glassy carbon electrode (5 mm diameter) in O$_2$ saturated 0.1 M KOH electrolyte at various rotating speeds using 10 mV/s scan rate. The catalyst loading in these experiments is fixed at 250 µg/cm$^2_{geo}$. The negative current values are related to the disk activity, while the positive current values represent the ring electrode activity (held at 1.2 V constant potential throughout the measurement). The y-axis values in the polarization curves in this figure are reported as electrode geometric area normalized currents.

Figure 33:
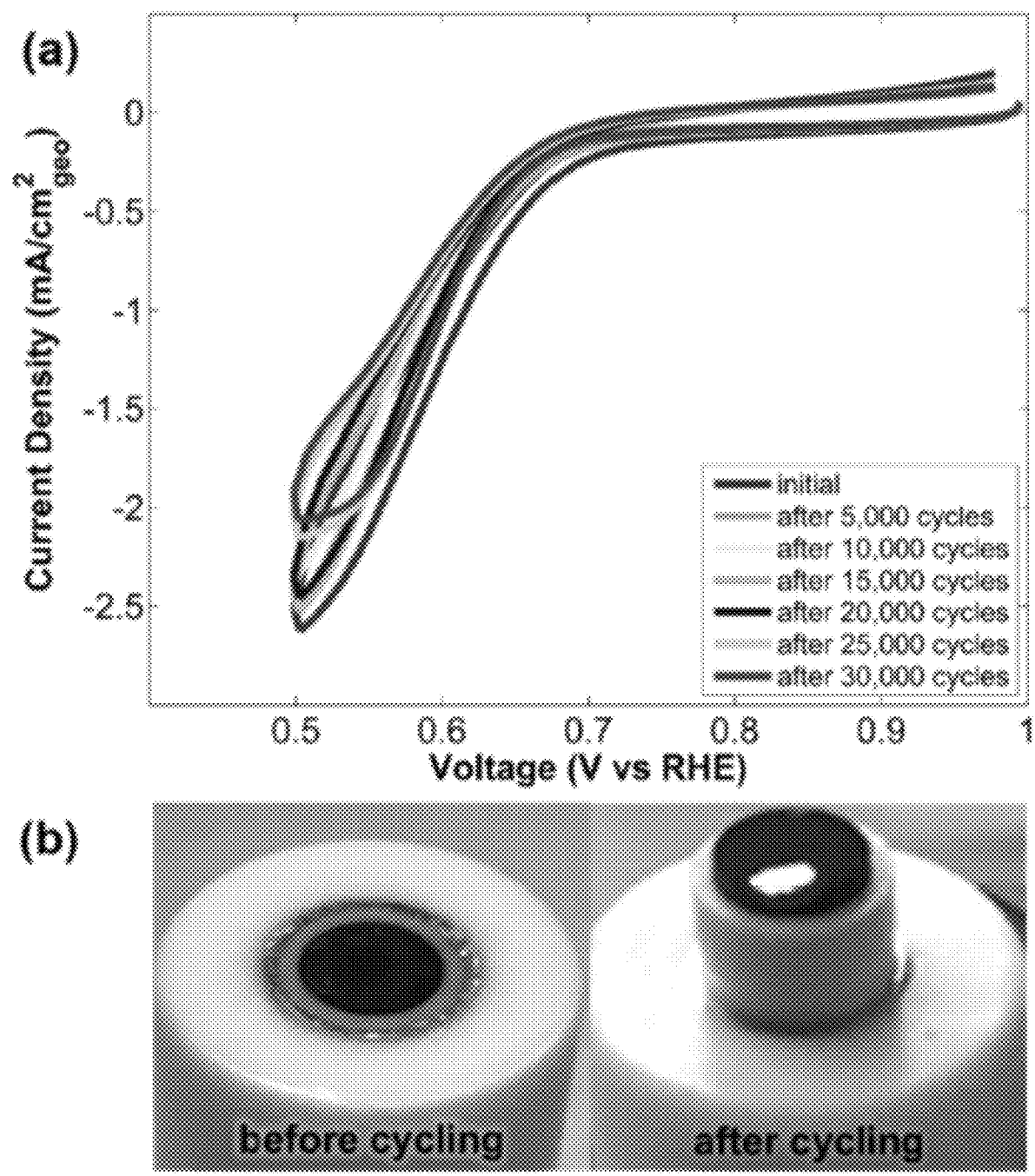

FIG. 33 illustrates (a) CVs of the Mn-LNO thin film electrode scanned from 0.5 V to 1 V with a scan rate of 0.1 V/s after every 5,000 cycles of CV scanning. Although 30,000 CV scans are recorded during the stability testing, we only report CVs after every 5,000 cycles for brevity. (b) Optical images of the Mn-LNO thin film electrode before and after 30,000 cycles of CV scanning. The image in the right shows that part of the film was peeled off from the glassy carbon electrode after 30,000 cycles (circled in red), which could be one of the potential reasons for the loss in activity of the electrode as seen in the diffusion limited region of the polarization curve of Mn-LNO.

FIG. 34 is a table showing ring collection efficiency values on Pt as a function of rotational speeds.

Figure 35:
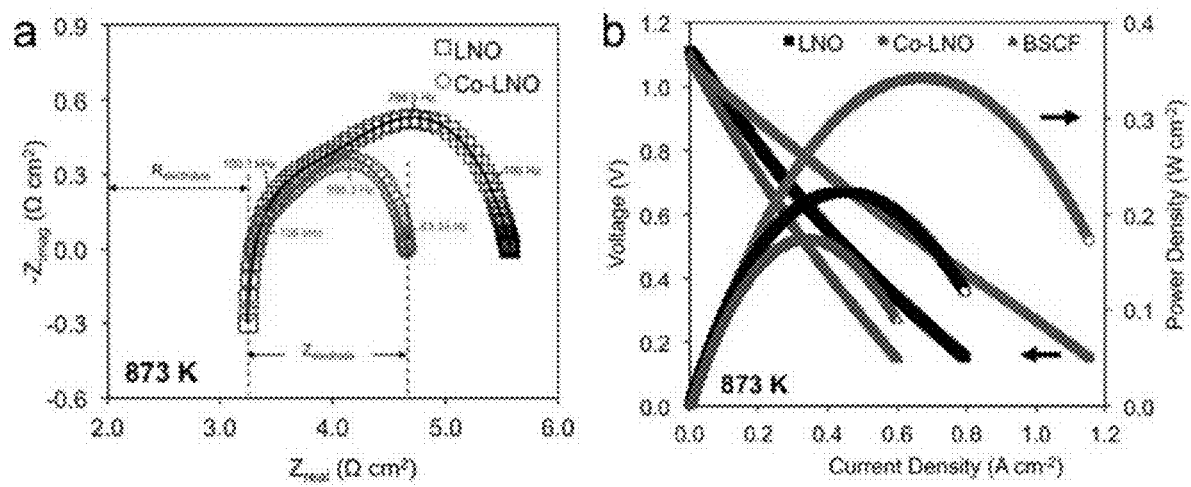

FIG. 35 shows (a) Impedance spectra for R-P oxides-YSZ I YSZ I YSZ-R-P oxides symmetric cells operating at $pO_2=1$ atm and 873 K. (b) Electrochemical performance of SOFCs containing LNO nanorods, Co-LNO nanorods, and $Ba_{0.5}Sr_{0.5}Co_{0.5}Fe_{0.2}$ (BSCF) at 873 K.

Figure 36:
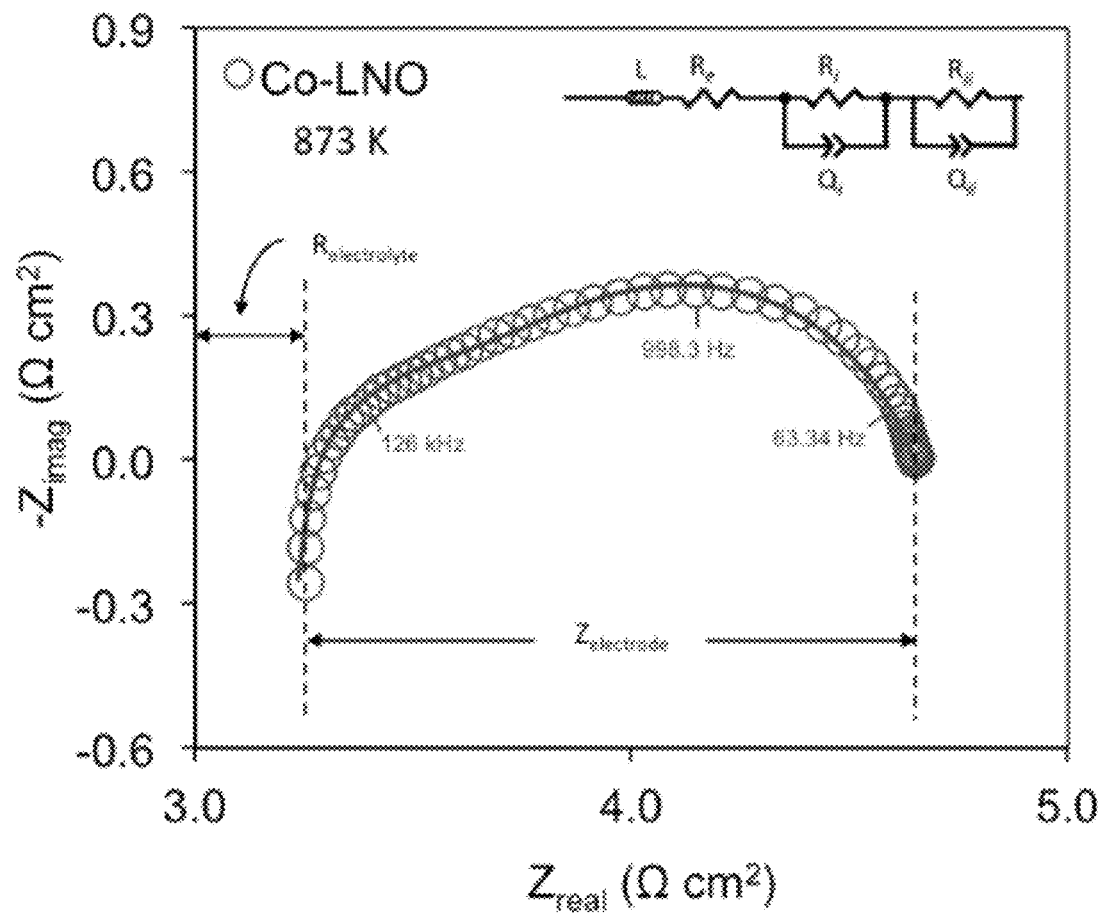

FIG. 36 illustrates electrochemical impedance spectra for Co-LNO/YSZ/YSZ/Co-LNO/YSZ symmetric cells at 873 K and $pO_2$ of 1 atm. The equivalent circuit used to fit of the polarization resistance curves is shown as an inset.

Figure 37:
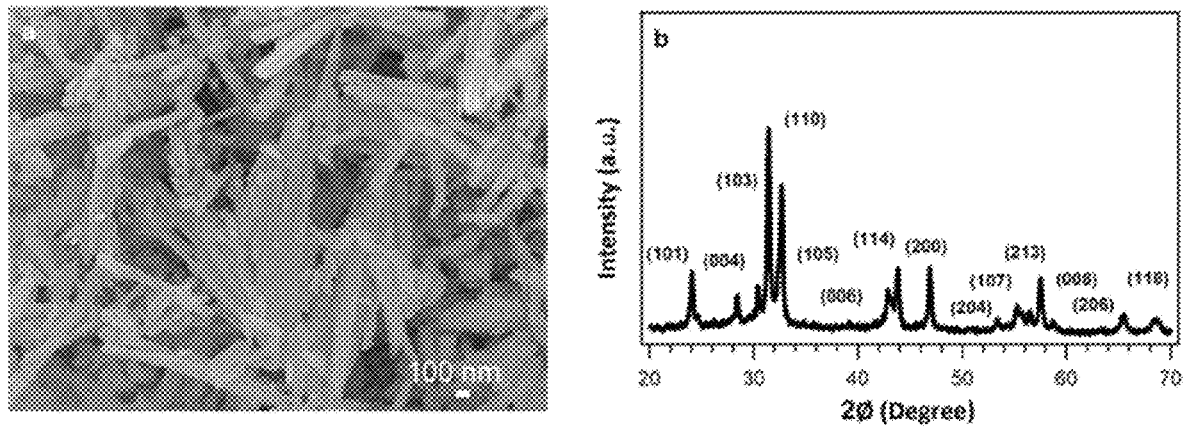

FIG. 37 is an SEM image (a) and XRD spectra (b) of as-synthesized $La_2Ni_{0.75}Co_{0.25}O_4$.

Figure 38:
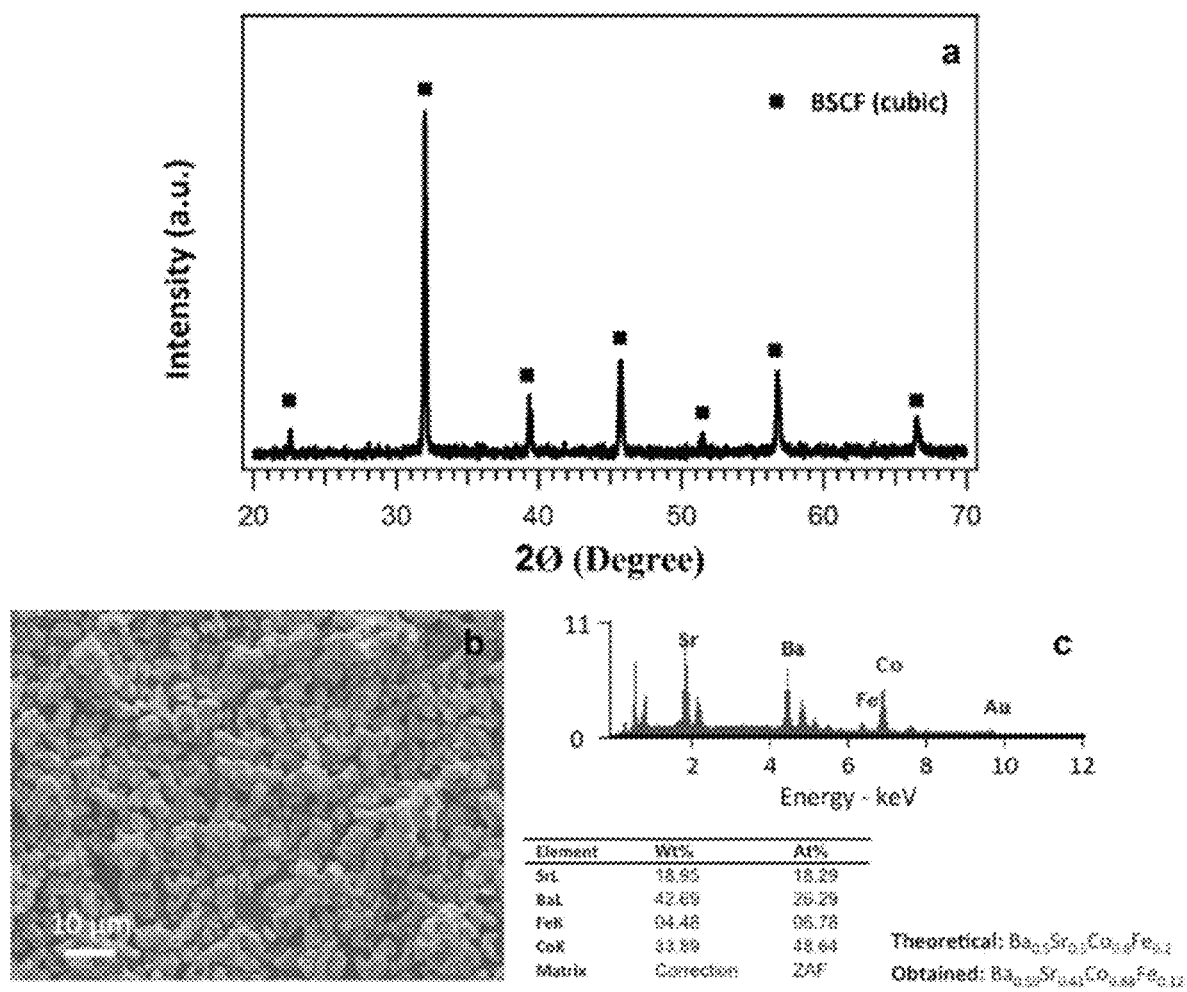

FIG. 38 represents XRD spectra (a), SEM image (b), and EDS spectrum (c) of the as-synthesized $Ba_{0.5}Sr_{0.5}Co_{0.5}Fe_{0.2}$.

FIG. 39 is a table showing maximum power density in comparison to literature values.

Figure 40:
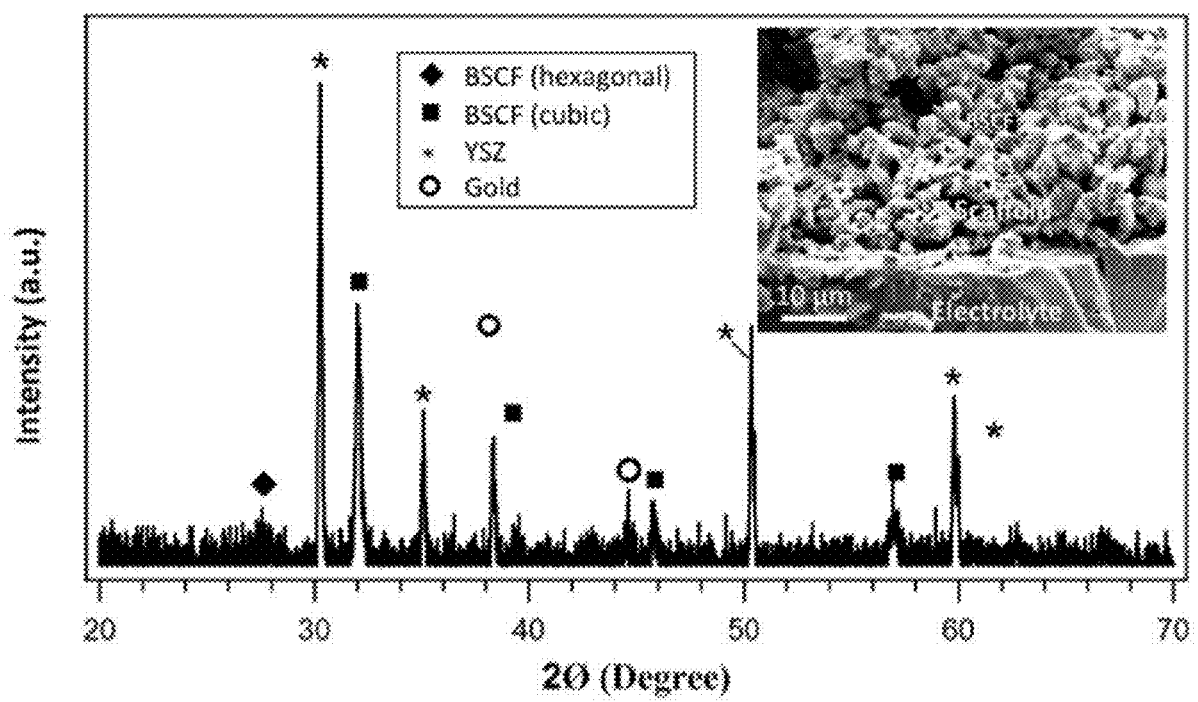

FIG. 40 represents a comparison of BSCF catalyst performance on YSZ-based anode-supported button cell SOFCs with literature reports, and post-reaction XRDISEM characterization of BSCF containing electrodes.

The drawings described herein are for illustration purposes only and are not intended to limit the scope of the present disclosure in any way.

DETAILED DESCRIPTION

The following description is merely exemplary in nature and is in no way intended to limit the present disclosure or its application or uses. For example, the mixed metal oxides made and used according to the teachings contained herein is described throughout the present disclosure in conjunction with electrocatalysis in order to more fully illustrate the composition and the use thereof. The incorporation and use of such mixed metal oxides in other applications, including, but not limited to, catalyzing a methane reforming reaction, or an oxygen transport or surface oxygen exchange reaction or the like are contemplated to be within the scope of the present disclosure. It should be understood that throughout the description, corresponding reference numerals indicate like or corresponding parts and features. Further areas of applicability will become apparent from the description provided herein. It should be understood that the description and specific examples are intended for purposes of illustration only and are not intended to limit the scope of the present disclosure.

Figure 1:
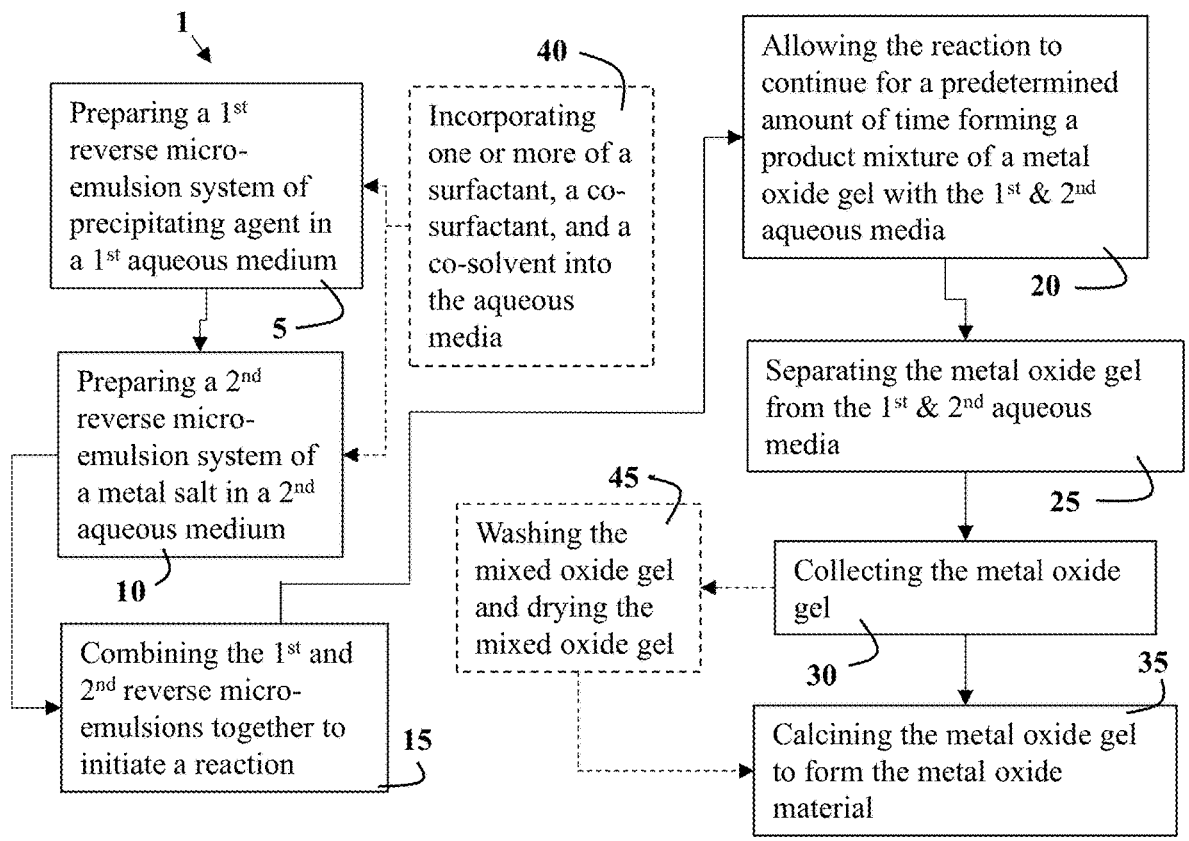
FIG. 1 is a schematic representation of a method of forming a metal oxide material having a rod shape or a polyhedral nanostructure according to the teachings of the present disclosure.

The present disclosure generally provides a method of forming a metal oxide material having a rod shape or a polyhedral nanostructure. Referring to FIG. 1, this method 1 comprises: preparing 5 a first reverse micro-emulsion system comprising a precipitating agent dispersed in a first aqueous medium; preparing 10 a second reverse micro-emulsion system containing a metal salt dispersed in a second aqueous medium; combining 15 the first and second reverse micro-emulsions together to initiate a reaction; allowing 20 the reaction to continue for a predetermined amount of time to form a product mixture comprising a metal oxide gel and the first and second aqueous media; separating 25 the metal oxide gel from the first and second aqueous media; collecting 30 the metal oxide gel; and calcining 35 the metal oxide gel to form the metal oxide material.

When desirable, the first and second aqueous media may further comprise 40 one or more of a surfactant, a co-surfactant, and a co-solvent, such that the surfactant is cetyl tetrammoniabromide (CTAB), the co-surfactant is an aliphatic hydrocarbon that has at least six carbon atoms, and the co-solvent is an aliphatic alcohol. One specific example among many examples for the co-surfactant is hexane and the co-solvent is n-butanol. The first and second aqueous media comprises a molar ratio (Wo) of water to surfactant that is controlled at a value of about 1:4; alternatively, about 1.6; alternatively, about 1:8.

The precipitating agent in the first ($1^{st}$) reverse micro-emulsion may include, but not be limited to, an alkali metal hydroxide, an alkali metal carbonate, or a combination thereof. The metal salt in the second ($2^{nd}$) reverse micro-emulsion may comprise a combination of metal cations that are independently selected from the elements of La, Pr, Mn, Cr, Ni, Fe, Co, Cu, Pt, Nd, Ca, Ba, or Sr, and an anion that is independently selected from a nitrate, an acetate, a chloride, or a combination thereof. At least one of the metal salt and the precipitating agent are present in a stoichiometric amount.

The predetermined amount of time over which the reaction is allowed to proceed is at least 2 hours; alternatively, at least 4 hours; alternatively, at least 6 hours. Alternatively, the reaction is allowed to proceed for a time selected to between 2 hours and about 10 hours; alternatively between 4 hours and 10 hours. Once the reaction is completed, the separation of the metal oxide gel from the first and second aqueous media may be accomplished using any known technique, including, but not limited to filtering or centrifuging the product mixture.

The calcination of the metal oxide gel may be performed at a temperature that is greater than 650° C.; alternatively, the calcination temperature is in the range of about 700° C. to about 1,000° C. When desirable, the method 1 may further comprise 45 washing the metal oxide gel with water/ethanol and drying the metal oxide gel in an oven prior to calcination. The temperature of the oven is at or above 70° C.; alternatively between about 75° C. and 100° C.; alternatively at 80° C.

According to another aspect of the present disclosure, a metal oxide material having a rod shape or a polyhedral nanostructure is prepared according to the method 1 described above and further defined herein. This metal oxide material corresponds to the chemical formula of $La_2M_xNi_{1-x}O_4$, $Pr_{2-y}A_yNiO_4$, or $La_{2-z}D_zNiO_4$, wherein M is copper (Cu), cobalt (Co), iron (Fe), manganese (Mn), chromium (Cr), aluminum (Al), or platinum (Pt); A is lanthanum (La) or neodymium (Nd); D is calcium (Ca), barium (Ba) or strontium (Sr); x ranges from 0 to 1; y ranges from 0 to 2; and z ranges from 0 to 0.25. This metal oxide material may be a Ruddlesden-Popper (R-P) oxide material. The metal oxide material may comprise alternating rock-salt (LaO or PrO) layers and perovskite ($LaM_xNi_{1-x}O_3$, $Pr_{2-y}A_yNiO_3$, or $La_{2-z}D_zNiO_3$) layers.

According to another aspect of the present disclosure, the metal oxide material may have a rod shape or a polyhedral nanostructure that corresponds to the chemical formula of $La_2M_xNi_{1-x}O_4$, such that M is manganese (Mn), chromium (Cr), or platinum (Pt), and x ranges from 0 to 0.25 is provided. Alternatively, this metal oxide material include platinum (Pt) as the metal (M) and has an x that is less than or equal to 0.05. This metal oxide material may be a Ruddlesden-Popper (R-P) oxide material.

According to yet another aspect of this disclosure the use of a catalyst comprising the metal oxide material described above or further defined herein in an electrochemical reaction, a methane reforming reaction, or an oxygen transport or surface oxygen exchange reaction is provided.

For the purpose of this disclosure the terms "about" and "substantially" are used herein with respect to measurable values and ranges due to expected variations known to those skilled in the art (e.g., limitations and variability in measurements).

For the purpose of this disclosure, the term "weight" refers to a mass value, such as having the units of grams, kilograms, and the like. Further, the recitations of numerical ranges by endpoints include the endpoints and all numbers within that numerical range. For example, a concentration ranging from 40% by weight to 60% by weight includes concentrations of 40% by weight, 60% by weight, and all concentrations there between (e.g., 40.1%, 41%, 45%, 50%, 52.5%, 55%, 59%, etc.).

For the purpose of this disclosure, the terms "at least one" and "one or more of" an element are used interchangeably and may have the same meaning. These terms, which refer to the inclusion of a single element or a plurality of the elements, may also be represented by the suffix "(s)" at the end of the element. For example, "at least one polyurethane", "one or more polyurethanes", and "polyurethane(s)" may be used interchangeably and are intended to have the same meaning.

Theoretically Predicted ORR Activity Trend.

Density functional theory (DFT) calculations are performed to guide the design of R-P oxide electrocatalysts for electrochemical oxygen reduction reactions (ORR) in alkaline media. The underlying mechanism and factors governing the activity are investigated on a series of oxides with different B-site compositions ($La_2Ni_{0.5}B_{0.5}O_4$, where B varies from Cr, Mn, Co, Ni, to Cu). Understanding the active surface structure of these electrocatalysts under relevant reaction conditions is critical in determining the reaction energetics for ORR. For instance, literature reports have shown under relevant ORR potentials (~0.8 V vs RHE, potential under which a fuel cell would operate), metallic Pt is covered by the adsorbed OH* intermediate in the ORR process, which acts as an active site blocker. Therefore, as a first step, the potential-dependent active surface phase diagrams of the R-P oxides are systematically studied at a constant pH of 13 (conditions consistent with our experimental studies discussed below).

Figure 2:
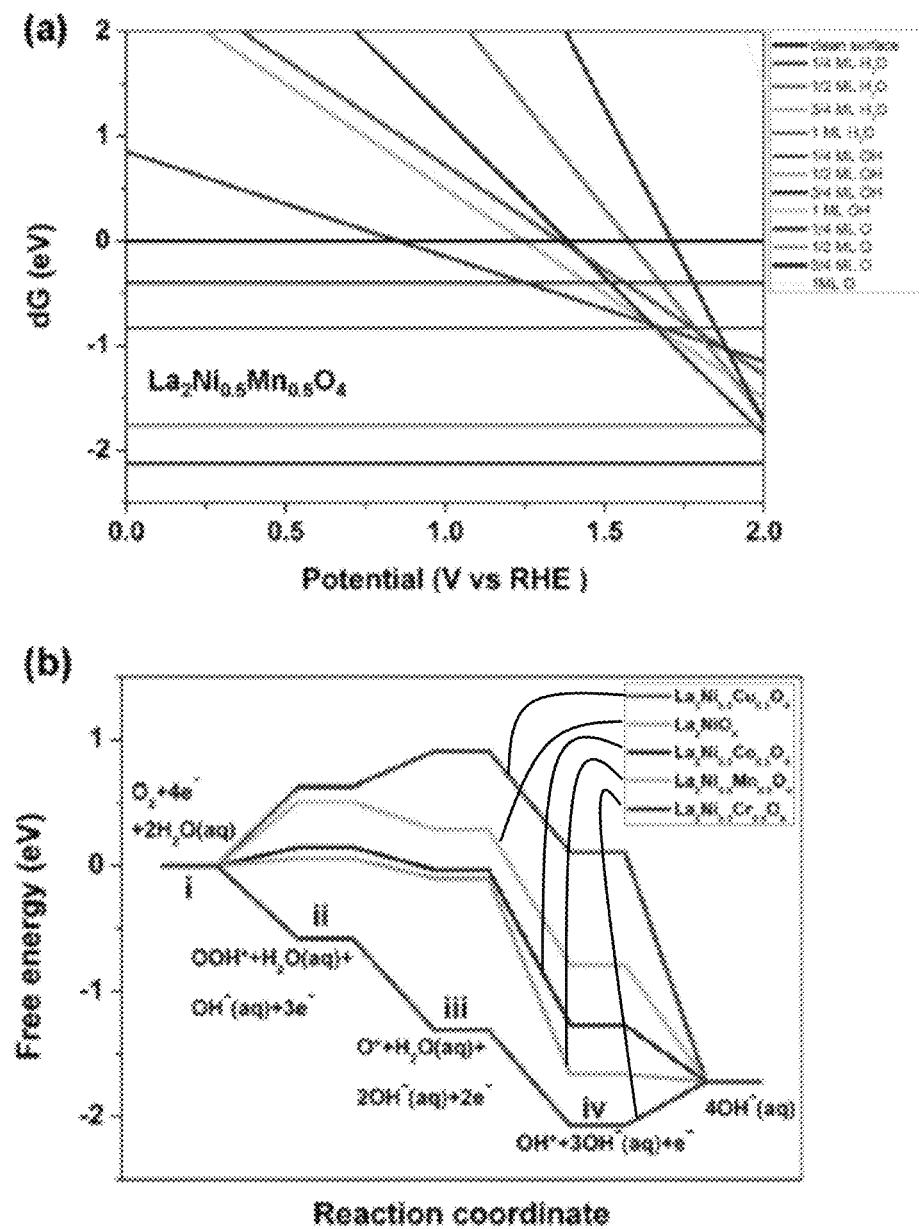
FIG. 2 is graphical representation of a) Surface free energies of the (001) terminated $La_2Ni_{0.5}Mn_{0.5}O_4$ as a function of $H_2O^*$, $OH^*$ and $O^*$ coverage and potential at a constant pH of 13 and b) Free energy diagram for ORR on $La_2NiO_4$ and $La_2Ni_{0.5}B_{0.5}O_4$ (B=Cu, Co, Mn, Cr) at a potential of 0.80 V (vs RHE) and pH of 13.

A main focus is on the effect of coverage of reactants, products, and intermediates involved in ORR on the surface structure as a function of potential, since corrosion of oxides in alkaline media is minimal within the ORR potential window. FIGS. 2a and 3 show that binding of $H_2O$ on the surface of the oxides is more favorable than its dissociation within the ORR potential window, which is further stabilized by an increase in the $H_2O$ coverage due to intermolecular H-bond formation. Under relevant ORR potentials, the oxide surfaces covered by $H_2O$ are thermodynamically the most stable, suggesting that R-P oxides are most likely covered by a monolayer of $H_2O$ under experimental reaction conditions. These results show that oxide surface structures covered by adsorbed OH* and O* species are favorable at much higher potentials than the potential window for ORR, especially in the case of O*, which is consistent with reported behavior on perovskites. Based on these results, when considering the energetics associated with the elementary steps involved in ORR, the references state is assumed to be the (001) oxide surface covered by 1 ML of $H_2O$, the most stable surface structure.

The preferred path for ORR in alkaline media involves a 4 e⁻ transfer process known as the associative mechanism, which can be described by equations 1-4.

$$O_2 + H_2O^* + e^- \rightarrow OOH^* + OH^-_{(aq)} \quad \text{Eq. (1)}$$

$$OOH^* + e^- \rightarrow O^* + OH^-_{(aq)} \quad \text{Eq. (2)}$$

$$O^* + H_2O_{(aq)} + e^- \rightarrow OH^* + OH^-_{(aq)} \quad \text{Eq. (3)}$$

$$OH^* + e^- \rightarrow * + OH^-_{(aq)} \quad \text{Eq. (4)}$$

The reduction of $O_2$ in the presence of one electron to OOH* is the first step in the catalytic cycle. We note that $O_2$ binding on the surface via an exchange with $H_2O^*$ is also considered, but is found to be less favorable as compared to the direct formation of OOH*, due to the weak binding of $O_2$ on these R-P oxides. This implies that the direct ORR mechanism via $O_2^*$ dissociation to 2O* on these oxides would be not significant. The second step involves the electrochemical reduction of OOH* to O* in the presence of another electron. In the third step, the adsorbed O* reacts with a hydrogen from $H_2O$ to form OH*. Finally, OH* is electrochemically reduced to OH⁻ in solution, freeing catalytic active sites. Assuming that the reference electrode is a reversible hydrogen electrode (RHE) such that $G_{OH^-_{(aq)}}-e^- + G_{H^+ + e^-} \Leftrightarrow G_{H_2O_{(aq)}}$, the Gibbs free energy of ($OH^-_{(aq)}-e^-$) are calculated as $G_{H_2O_{(aq)}} - 1/2 G_{H_2}$. Thus, the corresponding Gibbs free energy of the elementary step are determined using Equations 5-8.

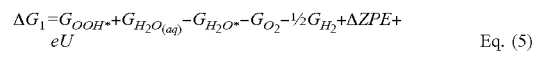
$$\Delta G_1 = G_{OOH^*} + G_{H_2O_{(aq)}} - G_{H_2O^*} - G_{O_2} - \tfrac{1}{2} G_{H_2} + \Delta ZPE + eU \quad \text{Eq. (5)}$$

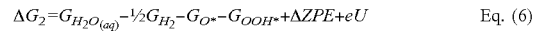
$$\Delta G_2 = G_{H_2O_{(aq)}} - \tfrac{1}{2} G_{H_2} - G_{O^*} - G_{OOH^*} + \Delta ZPE + eU \quad \text{Eq. (6)}$$

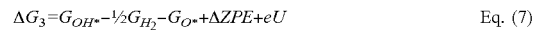
$$\Delta G_3 = G_{OH^*} - \tfrac{1}{2} G_{H_2} - G_{O^*} + \Delta ZPE + eU \quad \text{Eq. (7)}$$

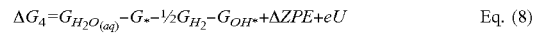
$$\Delta G_4 = G_{H_2O_{(aq)}} - G_* - \tfrac{1}{2} G_{H_2} - G_{OH^*} + \Delta ZPE + eU \quad \text{Eq. (8)}$$

Based on the above mechanism, the free energy diagrams for ORR on these R-P oxides are determined. At 0 V vs. RHE (FIG. 4), all the elementary steps involved in ORR are exothermic on these R-P oxides. On LNO, Cu-LNO, Co-LNO, and Mn-LNO oxides, the electrochemical reduction of $O_2$ to OOH* is less exothermic than the electrochemical reduction of O* and OH*, due to the weaker binding of OOH* as compared to O* and OH*. The only exception is Cr-LNO, where the reduction of OH* to OH⁻ ions is the least thermodynamically favored step, suggesting that desorption of OH* from the Cr-sites is challenging leading to potential poisoning of these sites by OH* under reaction conditions. When we consider the energetics of the ORR elementary steps under experimentally relevant operating potentials (~0.8 V vs RHE), the electrochemical reduction of $O_2$ to OOH* becomes thermodynamically limiting on LNO, Cu-LNO, Co-LNO, and Mn-LNO, while the reduction of OH* limits the reaction on Cr-LNO. Among these oxides, Mn-LNO exhibits the lowest thermochemical barrier for the rate-limiting step suggesting that it would lead to the highest activity for ORR, assuming that the kinetic barriers follow the same trends as the thermochemical barriers. On the other hand, the much higher thermodynamic barriers for this step on Cu-LNO and LNO imply that desorption of OOH* into the liquid phase is more favorable than that on the other oxides, which hinders the further reduction of OOH* decreasing the efficiency of the electron transfer for ORR.

DFT Activity Trend for Surface Oxygen Exchange—

The activity of electrochemical ORR/OER on R-P oxides is generally governed by the surface oxygen exchange process, which can be described by two reversible steps (see details in FIG. 5): (i) formation of a surface oxygen vacancy via surface lattice oxygen diffusion into an interstitial site, and (ii) $O_2$ dissociation on a surface oxygen vacancy. DFT calculations are used to determine the energetics associated with these elementary steps as a function of the B-site composition (B=Mn, Fe, Co, Ni, Cu, and Al) on B-site terminated (001) surfaces of these oxides (the most active surfaces for ORR). These studies show that doping the Ni-site of LNO with Mn, Cu, and Al leads to an increase in the energy barrier for surface oxygen vacancy formation through the diffusion of a surface lattice oxygen into an interstitial site as shown in the Table in FIG. 6. Conversely, doping it with Fe and Co facilitates this process, with Co-doped LNO exhibiting the lowest barrier of ~1.14 eV. The next step involves $O_2$ dissociation on a surface oxygen vacancy with one O atom filling the vacancy and the other one binding to an adjacent transition metal atom (FIG. 7*b*). In the case of the oxides with a mixed B-site, the O atom binds to the transition metal with the highest oxygen affinity, such as Mn, Fe, Co, and Al. The Table in FIG. 6*b* clearly shows that the B-site composition significantly affects the $O_2$ binding strength, which becomes weaker as the B-site metal varies from Al to Mn, Fe, Co, Ni, and Cu. For $O_2$ dissociation, a linear correlation between the energy of the transition state (barrier) with respect to gas-phase $O_2$ and the $O_2$ binding energy on a surface oxygen vacancy is found (FIG. 7*c*), where the weaker $O_2$ binding gives rise to a higher $O_2$ dissociation barrier and vice versa. Thus, the kinetics of $O_2$ dissociation can be inhibited by doping the B-site with Cu, but can be significantly improved by doping it with more oxophilic metals, such as Al, Mn, Fe, and Co. We note that the negative transition state energies reported for Al-, Mn-, and Fe-doped oxides stem from the energy of the located transition state being lower than the reference state ($O_2$ in gas phase and surface with a surface O vacancy), suggesting that $O_2$ dissociation on these oxides is barrierless via a so-called precursor-mediated mechanism.

The third step in the catalytic cycle involves oxygen evolution. The energetics of this step can be predicted using the formation energy of a surface oxygen vacancy ($V_O^{\bullet\bullet}$) generated from the desorption of a surface lattice O as ½ $O_2$ in the gas phase. This surface $V_O^{\bullet\bullet}$ formation energy is also found to be linearly correlated to the binding energy of $O_2$ on a surface oxygen vacancy (FIG. 7*c*), and becomes lower as $O_2$ binding becoming weaker. An intersection in the opposite linear trends for the energy of the transition state for $O_2$ dissociation and surface $V_O^{\bullet\bullet}$ formation energy ($O_2$ evolution) versus $O_2$ binding energy is found (FIG. 7*c*). The oxides (i.e., Co doped LNO) near this intersection provide the best compromise between the energetics associated with these two steps (the most critical for surface oxygen exchange), and thus are predicted to result in the highest activity for surface oxygen exchange. The last step involves healing of surface vacancy via oxygen diffusion from an interstitial site, which is generally favorable both kinetically and thermodynamically on these oxides (FIG. 6*a*).

A microkinetic model is used to determine the qualitative activity trend for this process (see Supplementary Materials). A "volcano"-type relationship between the calculated rates and the binding energies of $O_2$ on a surface O vacancy (FIG. 7*d*) is found, suggesting that the $O_2$ binding energy is a good descriptor for predicting the surface oxygen exchange activity of these oxides. This structure-activity relation predicts that oxides near the top of the "volcano" (i.e., Co-doped LNO) provide the optimal oxygen binding strength, and should exhibit the highest activity for oxygen reduction and evolution.

Catalyst Synthesis and Characterization.

To validate the predictions from DFT calculations, a series of nanostructured R-P oxides are synthesized using a reverse microemulsion method, including LNO and $La_2Ni_{1-x}M_xO_4$ (M=Cr, Mn, Co, and Cu). In the case of the oxides with mixed B-site compositions, the concentrations of the B-site M metals are kept constant (x=~0.12) to systematically link the effect of modifying the B-site composition on the ORR behavior. These concentrations are lower than the one used in our DFT model to assure that stable R-P structures are obtained for all the oxide compositions. This difference has limited effect on the activity trends as discussed in detail below.

FIGS. 8*a* and 9*a* show the scanning electron microscopy (SEM) images of the synthesized R-P oxide nanostructures, demonstrating the uniform distribution of the rod-like morphology among all catalysts. The physical surface areas of these nanostructured oxides are comparable, approximately 13.5±1.8 $m^2/g$ (FIG. 9*b*), as confirmed by $N_2$ physisorption studies. The X-ray diffraction (XRD) spectra of these nanostructures (FIG. 8*b*) clearly show that the oxides of different compositions exhibit the same R-P crystal structure to the standard bulk LNO, which possesses the $K_2NiF_4$ tetragonal within the I4/mmm space group. The chemical composition of the oxides is confirmed using inductively coupled plasma-mass spectrometry (ICP-MS) to be within 5% error of the targeted composition (FIG. 10). The surface structures of these nanostructures are characterized using high angle annular dark field-scanning tunneling electron microscopy (HAADF-STEM), energy dispersive X-ray spectroscopy (EDS), and low energy ion scattering spectroscopy (LEIS). The oxide nanostructures mainly expose the B-site metal oxide terminated (001) surfaces (FIGS. 8*c, d* and FIG. 11 for Co-LNO as an example). This is consistent with results using electron energy loss spectroscopy (EELS). The spectrum is collected after a sputter dose of $0.5 \times 10^{15}$ ions $cm^{-2}$ of 0.5 keV Ar+, which is used to remove the surface-layer atoms. La peak appears at ~2875 eV and both Ni and Co appear at ~1250 eV. The slightly broader peak shown at ~1250 is attributed to the overlap of the peaks ascribed both to Co and Ni. This result suggests that the B-site metals are present at the surface layers of R-P oxides.

A series of nanostructured, first-series R-P oxides, such as $La_2NiO_{4+\delta}$ (LNO), $La_2Ni_{0.88}Fe_{0.12}O_{4+\delta}$ (Fe-LNO), $La_2Ni_{0.88}Co_{0.12}O_{4+\delta}$ (Co-LNO), and $La_2Ni_{0.80}Cu_{0.20}O_{4+\delta}$ (Cu-LNO) are synthesized using a facile reverse microemulsion method. Powder X-ray diffraction (XRD) spectra (FIG. 12) show that these oxides follow the same crystallographic facets to the standard bulk LNO holding a $K_2NiF_4$ crystal structure within the I4/mm space group. Predominantly nanorod-shaped morphologies are observed using scanning electron microscopy (SEM) for all oxides (FIG. 13*a* and FIG. 14). We note that a lower B-site doping concentration than that in the DFT models is used here to consistently compare the activities among all the B-site dopants. The dopant concentration is limited by the fact that stable R-P structures could only be obtained for low doping of Fe.

High angle annular dark field-scanning tunneling electron microscopy (HAADF-STEM), low energy ion scattering spectroscopy (LEIS), energy dispersive X-ray spectroscopy (EDS), and angle-resolved X-ray photoelectron spectroscopy (AR-XPS) are used for detailed characterization of the surface structure of these oxide nanostructures. FIG. 13b shows a bright-field TEM image of a typical Co-LNO nanorod. The red square region is used to obtain the HAADF-STEM image shown in FIG. 13c, in which continuous lattice fringes are observed. The measured d spacings and indexing of the planes in the corresponding Fast Fourier Transform (FFT) pattern (FIG. 13d) show that Co-LNO nanorods mainly expose the (001) surfaces perpendicular to the projected zone axis, [110]. Similar results are also observed for the other nanostructured oxides, consistent with our previous reports on LNO nanorods.

LEIS studies are used to determine the elemental compositions of the surface of these oxides. Uniform films of the nanostructures are used to avoid any surface topographical artifacts in the measurements. Initially, these studies are performed on LNO nanorods as a baseline. Two energy peaks at 1250 and 2850 eV associated with Ni and La, respectively, are observed after exposing the surface to a dose of $0.5 \times 10^{15}$ ions $cm^{-2}$ of 0.5 keV $Ar^+$ (FIG. 15a). A depth profile analysis with an increasing sputtering dose is performed to detect the variations in the La and Ni signals from the surface to the bulk. FIG. 15b shows the ratios of La/Ni and Ni/La calculated from the areas under the respective LEIS peaks as a function of consecutive $Ar^+$ sputtering. The concentration of Ni is found to be higher than La in the surface layer and it decreases with depth, suggesting that Ni is predominant in the surface layer of the LNO nanorods. These findings are consistent with our previous observations using electron energy loss spectroscopy. In the case of the B-site doped oxides similar observations are obtained, but combined signals for Ni and the B-site dopants (i.e., Co and Fe) are observed (FIG. 16). This is not surprising since peaks in a LEIS spectrum are generally distinguished based on the atomic masses of the elements, making it hard to discriminate between elements with close atomic and isotopic masses.

Given the limitations of LEIS, we have used EDS line-scanning in STEM to identify the presence of the B-site dopants in the surface layers of the doped LNO nanorods. As an example, Co-LNO is systematically studied at different regions (FIGS. 15 and 17), providing evidence that Co is present in the surface and bulk of the nanostructures. In average, the ratio of La with respect to Co+Ni is ~2, consistent with the R-P structure of the oxide. Similar results are also observed for Fe— and Cu-LNO (FIGS. 18 and 19), which clearly show the presence of Fe and Cu in the structures. AR-XPS is used to characterize the near surface of Co-LNO at 0° and 80° tilt angles (with respect to normal surface at 0°) with corresponding detection depths of approximately 5.0 and 1.3 nm, respectively (FIG. 20). The expected oxidation states of $Co^{2+}$, $Ni^{2+}$, and $La^{3+}$ in the R-P structure are observed at both depths. The oxidation states of $La^{3+}$ and $Ni^{2+}$ in Co-LNO are consistent with those in the undoped LNO oxide (FIG. 21). These results reinforce the fact that the B-site dopants are present in the structure, and the oxides exhibit a uniform R-P structure without any indication of near surface reconstruction or segregations of the metals, in line with that observed from STEM (FIG. 15c).

Kinetics of Thermochemical Surface Oxygen Exchange—

$^{18}O_2$ labeled isotopic experiments are used to study the kinetics of thermochemical surface oxygen exchange on the well-controlled R-P oxide nanostructures. FIG. 4a depicts the Arrhenius relations obtained by plotting the normalized rates (TOF) of $^{16}O^{18}O$ formation as a function of the inverse temperature for Co-LNO, Fe-LNO, LNO, and Cu-LNO. TOF refers to the rate normalized per physical surface area of the catalyst as demonstrated in the table shown in FIG. 22. A reversed "volcano"-type relationship is found between the measured apparent activation energies for this process and the B-site composition (FIG. 23b). Co-LNO is found to exhibit the lowest apparent activation energy for this process. The following activity trend is observed: Co-LNO>Fe-LNO>LNO>Cu-LNO, which is in good agreement with the DFT predictions (FIG. 7d).

Post-reaction characterizations of these catalysts are carried out using SEM, XRD, and EDS line-scanning in STEM to assure that these nanostructures did not undergo changes during these studies. The SEM images (FIG. 24) and XRD spectra (FIG. 25) show that these nanostructures have maintained their structural integrity and no changes in their crystal structures can be detected. Furthermore, EDS studies (FIGS. 18, 19, 26) show that the signals of Co, Fe, and Cu dopants and Ni are consistent with those for the as-synthesized oxides. These results suggest that the nanostructures are stable under reaction conditions, and the kinetics are measured on the characterized nanostructures.

Electrochemical Performance.

The B-site compositional effect of these R-P oxides with well-controlled nanostructures on the ORR activity in alkaline media (0.1 M KOH) is investigated. Cyclic voltammograms (CVs) of these oxides deposited on glassy carbon electrodes in an Ar-saturated electrolyte (FIG. 27a) show no discernible peaks, suggesting the absence of significant electrochemical reduction and/or phase change of these materials. This is consistent with the DFT calculations that suggest these oxides are mainly covered by weakly adsorbed water molecules under these conditions. Conversely, CVs obtained in an $O_2$-saturated electrolyte show a pronounced increase in ORR activity of these oxides as compared to carbon (FIG. 27b) with the highest peak current ascribed to Mn-LNO, being approximately 3-fold higher than the one corresponding to the carbon support (XC-72R). The increase in reduction currents confirms the ORR activity of the oxides and the negligible contribution in activity from the carbon support. Furthermore, by closely observing the onset potential for the oxygen reduction peak of these oxides in the cathodic scan direction, the following trends are observed: Mn-LNO>Co-LNO>LNO z Cu-LNO>Cr-LNO, with the highest onset potential for Mn-LNO corresponding to the lowest activation barrier for ORR, consistent with DFT studies.

To further understand the ORR activity trend of these oxides, rotating ring disk electrode (RRDE) studies are performed to obtain insights regarding the intrinsic ORR kinetics with minimal mass transport artifacts. The polarization curves of the oxides obtained at 1600 rpm (when mass transport limitations are negligible) are shown in FIG. 28a. To properly compare the activity of the oxides, currents from the polarization curves are normalized with respect to the coverage of the active sites (denoted as "active area" with details provided in FIG. 6b) instead of the commonly used electrode geometric area. The active sites are determined based on the DFT insights provided in FIG. 2b. FIG. 2b shows that Mn-LNO and Co-LNO exhibit lower thermochemical barriers for the rate-limiting step than LNO due to the Mn and Co sites, respectively, being the active sites for this step as opposed to Ni. On the other hand, for Cu-LNO at low Cu concentrations, Ni sites act as the active sites since they exhibit a lower barrier for the rate limiting step in ORR when compared to the Cu sites. In the case of Cr-LNO, the strong binding of the OH* intermediate on the Cr sites will lead their poisoning, leaving Ni as the active site for ORR. The trend of the polarization curves normalized per coverage of active sites as a function of oxide composition is consistent with one obtained for the polarization curves normalized per geometric surface area of the electrode (FIG. 29). This further supports the assignment of the active sites in these oxides. For example, the currents normalized per geometric surface area of the electrode (the same in all cases) for Mn-LNO and Co-LNO are higher than LNO supporting the DFT predictions that Ni is not the active site in these oxides, since if it was the currents should be lower than LNO given that Mn and Co, respectively, would act as site diluters. This is only observed in the case of Cr-LNO and Cu-LNO, consistent with the fact that in these oxides Ni is the active site, while Cr and Cu, respectively, act as active site diluters.

To aid in differentiating between the ORR activation over potential losses as a function of the oxide composition, the onset potential from the polarization curves is consistently defined as the required potential for a resulting current of $-50$ $\mu A/cm^2_{active\ area}$ among all oxides. A closer look at the onset potential region (FIG. 28b) shows that Mn-LNO exhibits the lowest onset over-potential among these oxides, suggesting that the kinetic barrier for ORR is the lowest for Mn-LNO. Furthermore, Mn-LNO has the highest current density in the diffusion limited regime at ~9.3 $mA/cm^2_{active\ area}$, followed by Co-LNO at ~7.2 $mA/cm^2_{active\ area}$, while the rest of the R-P oxides (Cr-LNO, LNO and Cu-LNO) plateau at ~3 $mA/cm^2_{active\ area}$. Consistent with the previous observation from the $O_2$-saturated CVs, even small changes in the B-site composition of these R-P oxides significantly affect the ORR activity, with the trend following the DFT predictions.

The next step in our analysis involves determining the ORR reaction pathway via quantification of the number of electrons transferred in the process as a function of the nanostructured R-P oxide composition. The number of electrons transferred during ORR on all the catalysts is determined using two methods: (i) Koutecky-Levich (K-L) analysis, and (ii) RRDE analysis. Both K-L and RRDE analyses show that ORR on nanostructured Mn-LNO and Co-LNO selectively proceeds via a direct 4 e⁻ path (FIGS. 30 and 31). RRDE analysis also shows negligible $H_2O_2$ formation in the case of nanostructured Mn-LNO, suggesting that it is the most selective toward the direct 4e⁻ ORR process, similar to Pt-based electrocatalysts. The selectivity trend based on the number of electrons transferred is found to follow the same behavior as the ORR activity, indicating that LNO, Cu-LNO and Cr-LNO favor the peroxide formation, while Mn-LNO and Co-LNO proceed via a direct 4e- ORR path, consistent with the insights from DFT calculations discussed above. The K-L plots shown in FIG. 31a are derived from the voltammograms in FIG. 32 in which disk current values at different speeds (Levich squares) are used.

Koutecky-Levich analysis relates the total current density generated during ORR to the series resistances of two major processes: one associated with the current generated due to the mass-diffusion limitations, and the second related to the current generated due to the inherent catalytic activity of the investigated material. This is represented in the equation shown in FIG. 31c, where id is the measured current density for ORR, ik is the kinetic current density and idl is the diffusion-limited current density obtained using the equation shown in FIG. 31d, where n is the number of electrons involved in the ORR, F is the Faraday constant (96485 C/mol), $CO_2$ is the oxygen concentration of a fully saturated 0.1 M KOH electrolyte (1.21×10-6 mol/cm3), $DO_2$ is the oxygen diffusion coefficient in 0.1 M KOH (1.9×10-5 cm2/s), v is the kinematic viscosity of the electrolyte solution (0.01 cm2/s) and ω is the rotation rate (rad/s).

In addition to being active and selective for ORR, optimal electrocatalysts must also exhibit long-term stability under electrochemical conditions in alkaline media. To gain an understanding into the stability of these oxides, a modified DOE protocol for accelerated ageing is carried out over 30,000 cycles (~7 days) (FIG. 32a). One mainly focuses on the stability of nanostructured Mn-LNO as the best performing R-P oxide electrocatalyst tested for ORR. FIG. 33a shows the linear sweep voltammograms (LSVs) before and after 30,000 cycles of CV scans for Mn-LNO-containing electrode. Current density values at the half-wave potential of the initial LSV (~0.55 V) after every 1,000 cycles are used to quantify the loss of activity shown in FIG. 5b. At the end of 30,000 cycles, there is an observed loss of 16%, which is much lower compared to the 40% limit indicated in the DOE protocol. FIG. 32b shows that the main contribution to the loss of activity of the electrode at the end of 30,000 cycles is attributed to film degradation. The stability of Mn-LNO over 30,000 cycles is believed to be due to minimal restructuring of the oxides caused by oxidation/reduction of the transition metal atoms, which is negligible in these oxide structures within the ORR potential window. This also indicates that the current measured for Mn-LNO (FIG. 28) mainly stems from ORR activity, with no artifacts from the reduction of Mn or Ni in the oxide structure (FIG. 27a). This is contrary to perovskites, such as $LaMnO_3$, where the reduction of the transition metal atoms (Mn) results in current generation within the ORR potential window which overlaps with the ORR currents. The structural stability of the oxide is confirmed using X-ray photoelectron spectroscopy (XPS) studies as shown in FIGS. 33c-f. The results of the thin films containing nanostructured Mn-LNO before and after 30,000 cycles show that the major oxidation states of the B site metals (Ni and Mn) in Mn-LNO are similar before and after cycling. This suggests that no detectable changes in the oxide structure have occurred during cycling, thus indicating stability of the structure leading to long-term activity over an arduous and prolonged exposure to harsh experimental conditions.

Pt-ring electrode is also employed in the experiments as an electrochemical sensor to monitor the formation of hydrogen peroxide. The percentage of hydroperoxide generated during the reaction (FIG. 31b) is calculated by the equation shown in FIG. 31e. The number of electrons calculated using the ring-electrode agrees well with the findings from the K-L analysis (FIG. 31a), and it is calculated using the equation shown in FIG. 31f. As seen from equations 31e and 31f, IR and ID denote the ring and disk currents respectively; N on the other hand is the Pt ring collection efficiency shown in FIG. 34, which is determined independently. The collection efficiency values are measured in three independent trials. The overall mean, 0.24, is used in all subsequent calculations involving this parameter. The collection efficiency of the ring electrode is an important value incorporated in the calculation of the number of electrons involved in the electrochemical reaction. This value is solely dependent on the ring-disk electrode geometry. In order to utilize the ring electrode in the RRDE studies, the value of the collection efficiency has to be determined. The determination of the collection efficiency is done experimentally by utilizing a reversible one-electron redox couple. Fe(CN)63-4-/is the most commonly used redox couple. In this experiment, 4 mmol of $K_3[Fe(CN)6]$ is dissolved in 30 mL Ar-saturated 0.1 M KCl electrolyte. Hg/HgO is used as the reference electrode and Pt-gauze is used as the counter electrode. Chronoamperometry graphs are collected at various rotations by holding the disk potential at 1.5 V and the ring potential at 0.1 V. The potential values are chosen at well-defined diffusion limited regions of the redox reaction. Using the values obtained from these chronoamperometry graphs, the collection efficiency of the Pt-ring (N) is calculated by taking the ratio of the current generated on the ring electrode (ir) to the current generated on the disk electrode (id) which is shown in equation shown in FIG. 31(g).

To electrochemically evaluate the activity trends shown above, impedance studies (FIGS. 23c and 35a) on symmetric electrochemical solid oxide cells (R-P oxides-YSZ (yttria stabilized zirconia)|YSZ|YSZ-R-P oxides) at 550° C. and 600° C. are performed. The most active nanostructured Co-doped LNO is used as the electrode electrocatalyst and compared to nanostructured LNO as the base-case. The use of a pre-sintered YSZ scaffold at the electrode avoids exposing the nanostructures to very high temperature, minimizing sintering and undesired solid-state reactions between the R-P oxide and YSZ. Area specific resistances (ASRs) (resistances associated with the symmetric electrodes) are measured as a function of temperature and the nature of the electrocatalyst. ASR calculations are detailed in FIG. 35. Two main electrode resistances are observed: $ASR_i$ associated with the resistance induced from the oxygen ions transport through the electrocatalyst/electrolyte interface, and $ASR_{ii}$ associated with the resistance from the charge-transfer/surface O vacancy healing step in the process, as detailed in our previous work[37]. Significantly lower resistances are observed for Co-LNO containing electrodes at both temperatures as compared to the ones with LNO. For instance, the respective values of 0.339 and 0.394 $\Omega cm^2$ for $ASR_i$ and $ASR_{ii}$ on Co-LNO containing electrodes at 600° C. are much lower than the corresponding values of 0.628 and 0.601 $\Omega cm^2$ on LNO containing ones. These results clearly demonstrate that doping the Ni-site of LNO with Co leads to lower over-potential losses for the critical steps in electrochemical oxygen surface exchange and reduction, consistent with the findings above. Consequently, increasing the Co-doping concentration in the oxide should lead to an increase in the number of active sites, resulting in even higher overall activity per geometric surface area of the electrode.

LNO nanorods with higher Co doping (25%, $La_2Ni_{0.75}Co_{0.25}O_4$) are synthesized (FIG. 36) and incorporated as cathode electrocatalysts in anode-supported SOFCs (Ni—YSZ (anode)|YSZ (electrolyte)|YSZ-R-P oxides (cathode)). In these cells, $O_2$ is electrochemically reduced ($\frac{1}{2}O_2 + 2e^- \rightarrow O^{2-}$) by the R-P oxides at the cathode generating oxygen ions ($O^{2-}$), which are transported through the YSZ electrolyte to the anode, where $H_2$ electro-oxidation ($H_2 + O^{2-} \rightarrow H_2O + 2e^-$) takes place. FIGS. 23d and 35b show the current density vs. cell voltage (I-V) and power density (I-P) curves for SOFCs operating at 550 and 600° C., respectively. The SOFCs containing Co-LNO exhibits ~50% higher current and power densities than those containing LNO. For instance, the obtained maximum power density for Co-LNO containing SOFC is ~0.20 $W/cm^2$ at 550° C., as compared to ~0.10 $W/cm^2$ for LNO containing SOFC. To further assess the potential of these R-P oxides for intermediate-temperature SOFCs, comparative studies with high ORR performing perovskites, such as $Ba_{0.5}Sr_{0.5}Co_{0.8}Fe_{0.2}$ (BSCF), are conducted under the same conditions (FIGS. 23d, 35b, and 37). The performance of SOFCs containing Co-LNO nanorods is superior to those containing BSCF- ~0.2 vs. 0.08 $W/cm^2$ and ~0.34 vs. 0.17 $W/cm^2$ at 550 and 600° C., respectively. The BSCF performance is similar to the reported ones for YSZ-based anode-supported SOFCs. The use of a pre-sintered YSZ scaffold in this case eliminates the problematic co-firing step between BSCF and YSZ, minimizing the formation of impurity phases (i.e., $BaZrO_3$, $Co_3O_4$, and $Sr_2(CoFe)O_5$). XRD and SEM characterization of the BSCF-YSZ electrodes (FIG. 38) confirms the chemical stability of the system, supporting the fact that the measured electrochemical cathode performance is due to BSCF. We also find that the performance of the intermediate-temperature YSZ-based SOFCs containing Co-doped lanthanum nickelate oxide nanorods at the cathode is higher than the performance of similar systems in the literature (see FIG. 39).

The electrochemical stability of Co-LNO nanostructures as cathode electrocatalysts for SOFCs is tested using constant current studies, where the voltage of the cell is monitored as a function of time (FIG. 40a). The SOFC is operated in galvanostatic mode (constant current of 720 mA $cm^{-2}$) for about 140 h at 700° C., which is higher than the studies above to assure stability of these nanostructures at the upper limit of the intermediate temperature regime (500-700° C.). FIG. 40a shows a stable electrochemical performance during this testing period. Characterization of the cathodes using SEM and XRD after the stability test shows no significant detectable changes in the nanostructure and crystal structure of Co-LNO nanorods (FIG. 40). These results clearly demonstrate that Co-LNO nanostructures are promising intermediate-temperature ORR electrocatalysts exhibiting high activity and long-term stability.

EXPERIMENTS

The following specific examples are given to illustrate the mixed metal oxides formed according to the teachings of the present disclosure, as well as the method of forming such mixed metal oxides, and the use thereof. These specific examples should not be construed to limit the scope of the disclosure. Those skilled-in-the-art, in light of the present disclosure, will appreciate that many changes can be made in the specific embodiments which are disclosed herein and still obtain alike or similar result without departing from or exceeding the spirit or scope of the disclosure. One skilled in the art will further understand that any properties reported herein represent properties that are routinely measured and can be obtained by multiple different methods. The methods described herein represent one such method and other methods may be utilized without exceeding the scope of the present disclosure.

Example 1—Formation of Mixed Metal Oxides

The synthesis procedure for the catalysts with different chemical composites involves the reaction of two reverse microemulsion systems. Each reverse microemulsion system is quaternarily composed of cetyltrimethylammonium bromide (CTAB)-water-hexane-n-butanol with stoichiometry metal ions or precipitate agent. In the synthesis of rod shape or polyhedral nanostructure of different chemical composites, NaOH and KOH can be used as precipitate agent with controlled water to CTAB molar ratio. However, other precipitate agents, such as $Na_2CO_3$ and $K_2CO_3$, can be used in the synthesis of polyhedral nanostructures. After the microemulsions are well mixed, the microemulsion system containing metal salts is added to the system containing the base under stirring. The mixture is maintained under the same conditions for at least four hours to form the sol-gel suspension containing the precipitated complex metal hydroxide. The solid-gel is collected by centrifugation. This is followed by washing multiple times using ethanol and DI water. The solid gel is then dried under static air at 80° C. overnight and calcined at temperatures varying from 700° C.-1000° C. for two hours under argon or air in a quartz tubular reactor depending on the chemical composition and nanostructure of the oxide.

According to another aspect of the present disclosure, the synthesis procedure for preparing $La_2Ni_{0.88}Co_{0.12}O_{4+\delta}$. May comprising adding into two separate round bottom flasks, ~0.03 mol cetyltrimethylammonium bromide (CTAB), 11 ml nbutanol, and 56 ml hexanes. The base and the metal salt solution are prepared in deionized water in two separate vials. The base solution is prepared by dissolving ~0.02 mol KOH in 5.6 ml de-ionized water. The metal salt solution is prepared by dissolving 4 mmol La(N03)3-6H2O (99.999%, Sigma Aldrich), 1.75 mmol Ni(N03)2.6H2O (98%, Alpha Aesar), and 0.2 mmol CO(N03)2.6H2O (99.999%, Sigma Aldrich) in 0.8 ml de-ionized water. The base solution is added to one of the round bottom flasks and the metal salt solution is added to the other one. Vigorous stirring and intermittent ultrasonic treatments are carried out to obtain a transparent micro-emulsion suspension in each flask. Thereafter, the two micro-emulsions are mixed and stirred at 1100 rpm for 4 hours. The resulting gel is separated from the suspension by centrifugation (8000 rpm, 3 min) and washed with ethanol (3 times, 35 ml each time) and then de-ionized water (3 times, 35 ml each time). Each washing comprised of adding an appropriate solvent, mixing and intermittent ultrasonic treatment to disperse the solids and subsequent centrifugation at 8000 rpm for 3 minutes. The rest of the nanostructured R-P oxides are prepared by an analogous method. The obtained solids are all dried for 12 hours at 80° C. and calcined under an Ar flow at 825-925° C.

Example 2—Composition of Mixed Metal Oxides Formed

The composition of various R-P oxides formed are described in Table 1 below along with a description of the differences observed between conventional mixed oxide materials.

TABLE 1

Composition of Mixed Metal Oxides

| R-P oxide | M/A | x/y | Difference from Conventional Mixed Metal Oxides |
|---|---|---|---|
| $La_2M_xNi_{1-x}O_4$ | Cu | 0-1 | Nanostructure; Surface structure; Catalytic activity. (When x = 0-0.25, both rod shape and polyhedral nanostructure can be achieved by varying the water to CTAB molar ratio. When x is more than 0.25, only a polyhedral nanostructure can be achieved.) |
| | Co | 0-1 | Nanostructure; Surface structure; Catalytic activity. (When x = 0-0.25, both rod shape and polyhedral nanostructure can be achieved by varying the water to CTAB molar ratio. When x is more than 0.25, only a polyhedral nanostructure can be achieved.) |
| | Fe | 0-0.25 | Nanostructure; Surface structure; Catalytic activity. (Both rod shape and polyhedral nanostructure can be achieved by varying the water to CTAB molar ratio at the range of x = 0-0.25.) |
| | Mn | 0-0.25 | Both rod shape and polyhedral nanostructure can be achieved by varying the water to CTAB molar ratio at the range of x = 0-0.25. |
| | Cr | 0-0.25 | Both rod shape and polyhedral nanostructure can be achieved by varying the water to CTAB molar ratio at the range of x = 0-0.25. |
| | Pt | 0-0.25 | When x = 0-0.05, both rod shape and polyhedral nanostructure can be achieved by varying the water to CTAB molar ratio. When x is more than 0.05, only a polyhedral nanostructure can be achieved. |
| $Pr_{2-y}A_yNiO_4$ | La | 0-2 | Nanostructure; Catalytic activity. (Size controlled spherical nanoparticles can be synthesized in the range of y = 0-2.) |
| | Nd | 0-2 | Nanostructure; Catalytic activity. (Size controlled spherical nanoparticles can be synthesized in the range of y = 0-2.) |
| $La_{2-y}A_yNiO_4$ | Ca | 0-0.25 | Nanostructure; Surface structure; Catalytic activity. (Both rod shape and polyhedral nanostructure can be achieved by varying the water to CTAB molar ratio at the range of x = 0-0.25.) |
| | Ba | 0-0.25 | Nanostructure; Surface structure; Catalytic activity. (Both rod shape and polyhedral nanostructure can be achieved by varying the water to CTAB molar ratio at the range of x = 0-0.25.) |
| | Sr | 0-0.25 | Nanostructure; Surface structure; Catalytic activity. (Both rod shape and polyhedral nanostructure can be achieved by varying the water to CTAB molar ratio at the range of x = 0-0.25.) |

DFT Calculations—

Spin-polarized DFT calculations are performed using Vienna ab initio Simulation Package (VASP). The exchange-correlation interaction is described by the generalized gradient approximation (GGA) and Perdew-Burke-Ernzerhof (PBE) functional. The Kohn-Sham equations are solved using a plane-wave basis set with a kinetic energy cutoff of 400 eV. The bulk R-P oxides with tetragonal symmetry in the I4/mmm space group is used for $La_2Ni_{1-x}B_xO_4$ (B=Cr, Mn, Co, Ni, and Cu; x=0.5). Homogeneous structures are used for the oxides with mixed B-site metals. The B-site terminated (001) surface is modeled using a thirteen-layer slab model with a (2×2) unit cell. A (2×2×1) k-point mesh is used to sample the surface Brillouin zone, and a 12 Å vacuum is introduced with correction of dipole moment between the repeated slabs along the z-direction. During optimization, the bottom-two layers of the slab are fixed, while the remaining atoms and adsorbates are relaxed until the residual force is less than 0.02 eV/Å. DFT+U correction is used for the 3d-orbitals of the transition metals to overcome the shortcoming of the current exchange-correlation functional for describing the electrons of transition metal oxides, with the U values adopted from literature. We find that the influence of the hyperstoichiometric interstitial O on the binding strength of the intermediates is negligible, thus the stoichiometric structures are used to obtain the energetics associated with the elementary steps involved in ORR. For the Gibbs free energy calculations of the elementary steps, the energy of gas-phase $O_2$ is referenced with respect to gas-phase $H_2O$ and $H_2$ to avoid the current DFT drawbacks in describing $O_2$ in the gas phase. The energy of the liquid phase $H_2O$ is derived from an entropic correction to the gas-phase $H_2O$ at 0.035 bar. The pH effect on the free energy is corrected using $-kT\ln[H^+]$. The solvent effect of $H_2O$ is important to stabilize the intermediates involved in ORR, but the structure of the interfacial water is still unclear. Here, it is modeled by one water bilayer with hexagonal ice-like structure.[1]

General Synthesis—

All chemicals are used as commercially received without further purification. The nanostructured electrocatalysts are synthesized using a quaternary reverse-microemulsion method as reported elsewhere. Two separate reverse-microemulsions are first prepared, with each containing a quaternary reverse-microemulsion system composed of cetyltrimethylammonium bromide (CTAB)/water/hexane/n-butanol. One microemulsion is formed by mixing 4.0 mmol of $La(NO_3)_3 \cdot 6H_2O$ (99.999%, Sigma-Aldrich), 1.75 mmol of $Ni(NO_3)_2 \cdot 6H_2O$ (99.9%, Sigma Aldrich) and 0.25 mmol of the correspondent B-site metal nitrate or chloride (Mn, Co, Cu and Cr) dissolved in ~0.8 mL of deionized (DI) water. The other microemulsion is formed by mixing 3.68 mM KOH (ACS grade, Sigma-Aldrich). In each microemulsion system, the amount of CTAB, hexane, and n-butanol is fixed at 11 g, 56 mL and 11 mL, respectively. After the solutions are well mixed, the microemulsion system containing metal salts is added to the system containing the base under stirring. The mixture is maintained under the same conditions for four hours to form the sol-gel suspension containing the precipitated complex metal hydroxide. The solid-gel is collected by centrifugation. This is followed by washing multiple times using ethanol and deionized water. The solid gel is then dried under static air at 80° C. overnight and calcined at 835° C. for two hours under argon in a quartz tubular reactor.

According to another aspect of the present disclosure, pure $La_2NiO_{4+\delta}$ and B-site doped $La_2Ni_{0.88}B_{0.12}O_{4+\delta}$ (B=Fe, Co, and Cu) oxides are synthesized using a reverse micro-emulsion method. Briefly, two separate quaternary reverse micro-emulsions each containing a surfactant (cetyltrimethylammonium bromide, CTAB), de-ionized water, hexane, and n-Butanol are prepared. In the first reverse micro-emulsion, an appropriate amount of the precipitating agent (KOH) is added, while in the second one the nitrates of La, Ni, Fe, Co, and Cu are added with the appropriate ratios that result in a $A_2BO_4$ structure. This is followed by mixing the two micro-emulsions and stirring for 4 hours. The resulting gel is separated by centrifugation, washed, dried, and calcined to yield the desired catalyst.

Characterization—

The morphology of each sample is analyzed using a field-emission scanning electron microscope (SEM, JSM-7600, JEOL Inc., Japan) at an acceleration voltage of 15 kV, equipped with an energy dispersive spectroscopy (EDS) detector to evaluate the compositional atomic ratio of the metal oxides. The atomic resolution HAADF-STEM is analyzed using JEOL-2100F probe-corrected Analytical Electron Microscope at an acceleration voltage of 200 kV. Elemental analysis of the synthesized oxides catalysts is also performed using an Agilent 7700x inductively coupled plasma-mass spectrometer (ICP-MS). The X-ray diffraction (XRD) characterization of each sample is performed with a powder X-ray diffractometer (D2 Phaser, Bruker Corporation) using Cu Kα radiation (λ=1.54 Å). XRD spectra of fresh electrocatalysts are recorded over 2θ values of 20°-80° at a rate of 2°/min. X-ray Photoelectron Spectroscopy (Kratos axis ultra XPS) measurements are conducted using a monochromatic Al K-α source and used to determine the oxidation state of the A and B site metals in the oxide before and after electrochemical studies. The physical surface areas for all electrocatalysts are determined by $N_2$ physisorption studies using the Micromeritics ASAP 2020 analyzer. The exposed surface of each of the catalysts is probed using low energy ion scattering spectroscopy (LEIS) studies, which are performed using an ION-TOF Qtac 100 spectrometer with a primary ion beam of 5 keV $Ne^+$ as the probe and GRAMS32 software (Thermo-Fisher Company) for calculating the area under the curve of the generated spectra.

Thin-Film Preparation—

Slurries are prepared by ultrasonicating 15 $mg_{catalyst}$, 3 $mg_{carbon}$ (XC-72R, FuelCell store), 64.5 $\mu L_{nafion}$ (5 wt % Nafion solution, Ionpower) in 2.99 mL mixture of water and 2-propanol (IPA) (3:1 DI water to IPA volume ratio) in an iced bath for 30 minutes.[47] Prior to thin-film deposition, the glassy carbon (GC) disk electrode is polished to a mirror-finish using 0.05 µm alumina suspension (Allied High Tech Products) on a 2.875" microfiber cloth (Buehler), followed by sonication in DI water and IPA. The GC disk substrate is left to dry at room temperature under nitrogen. 10 µL of the aliquot slurry is drop-casted on the 5 mm diameter GC disk electrode while under rotation at 700 rpm to provide uniform distribution of the catalyst film and minimize the coffee-ring effect.[48] The final loadings of the catalyst and carbon are 250 $\mu g/cm^2_{geo}$, 50 $\mu g/cm^2_{geo}$, respectively. Nafion loading of 50 $\mu g/cm^2_{geo}$ is used to minimize $O_2$ transport resistance within the ionomer binder phase. The density of the unheated, water-immersed recasted Nafion is ~1.4 $g/cm^3$.[49] The resulting Nafion film thickness based on the geometric area of the GC disk electrode is ~0.36 µm (below the 0.5 µm reported limit)[50], making film resistance induced from Nafion insignificant.

Electrochemical Measurements—

Electrochemical tests are performed in a 0.1 M KOH (99.99% Potassium Hydroxide, Sigma-Aldrich dissolved in DI water) electrolyte solution in a 30-mL glass electrochemical cell. The disk electrode used in this study is glassy carbon (GC, 5 mm diameter) equipped with a platinum ring electrode. Platinum coil is used as the counter electrode, while Hg/HgO in 20 wt. % KOH (Koslow) is used as the reference electrode. Prior to each experiment, the reference electrode is calibrated against the hydrogen reference electrode (Figure S11). All voltages reported in this study are referenced with respect to the reversible hydrogen electrode (RHE), unless otherwise specified. The collection efficiency, (N), of the rotating ring-disk setup is independently measured in this experiment by employing the reversible 1-electron redox process of the $Fe(CN)_6^{3-}/4-$ redox couple (Table S2). This value is subsequently used in calculating the number of electrons involved in ORR using RRDE analysis (Table S2 and details in Supporting Information).

Prior to testing, the electrolyte is saturated with argon (20 sccm) through a bubbler immersed in the electrolyte. Impedance spectroscopy studies are performed using VersaSTAT (Princeton Applied Research) at 35 kHz frequency with a 10 mV excitation signal. The resistance is found to be in the range of 40 to 45Ω and is used to remove the effect of the ohmic losses (referred to as $E_{iR\text{-}free}$) from the collected voltage. Cyclic voltammograms (CVs) are first collected in Ar-saturated electrolyte multiple times at 50 mV/s until reproducible voltammograms are achieved using a bipotentiostat (Pine Instruments) equipped with an MSR rotator and controlled using AfterMath™. Background LSV is collected at various rotational speeds between 100 and 2500 rpm at 10 mV/s cathodic scan rate from 1.1 V to 0.05 V. The platinum ring potential is held at 1.25 V (which represents the oxidation of $H_2O_2$ at a sufficient diffusion-limiting current). The same experiments are performed under a flow of oxygen. Data are corrected by subtracting the $O_2$-saturated voltammograms from the Ar-saturated nes to account for the capacitance corrections. The ohmic losses are accounted for by subtracting (iR) from the observed potential ($E_{applied}$-iR) where i is the detected current value and R is the uncompensated electrolyte resistance discussed above. All electrochemical tests are collected within a 2-hour period to avoid any interference of glass etching in alkaline media[52] at room temperature (~21° C.).

Electrochemical stability tests are performed by using the procedure from a modified US Department of Energy's accelerated durability test protocol. LSVs before and after 30,000 cycles are used as a measure of catalyst stability by observing any changes in the current densities at the half-wave potential based on the initial LSV. The thin film electrode containing the catalyst is subjected to 30,000 cycles of CV scanning in 0.1 M $O_2$-saturated KOH between 0.5 and 1.0 V at 900 rpm with a scan rate of 0.1 V/s. Polarization curves are obtained after every 1,000 cycles (every 5 hours). The electrolyte is replaced after every 10,000 cycles to minimize possible carbonate contamination of the electrolyte, which has shown to affect the activity of these thin films.

Solid Oxide Fuel Cells—

The anode of the SOFC is composed of a mixture of NiO, yttria stabilized zirconia (YSZ), and graphite powders (1:1:1 weight ratio). The mixture is ball milled and later dry-pressed into pellets of 13 mm diameter. Graphite is removed by heating at 400° C. for 2 hours. The electrolyte is deposited on the anode surface via spin-coating. The resultant anode-electrolyte assembly is sintered at 1450° C. for 4 hours in air. A porous YSZ scaffold layer (YSZ (70):graphite (30)) is sprayed over the electrolyte layer and sintering at 1450° C. for 4 hours. The appropriate R-P oxide (~1 mg) dispersed in ethanol is drop coated over the YSZ scaffold, and calcined at 400° C. for 3 hours. Consistently, the resulting electrochemical cell have a cathode geometric area of 0.1 $cm^2$ with ~500 μm and 15 μm thick anode and electrolyte layers, respectively. Gold mesh and gold wires are used as current collectors and electrical connections, respectively. The cells are placed in alumina reactors and the anode initially reduced for 12 hours at 700° C. under 30% $H_2/N_2$ atmosphere (50 sccm). Thereafter, the anode is exposed to $H_2$ at 50 sscm and cathode is exposed to $O_2$ (300 sccm). Linear sweep voltammetry measurements are performed using a Gamry 300 potentiostat (Gamry Inst. Warminster, Pa.).

Symmetric Electrochemical Cells—

The symmetric cells are comprised of two identical, symmetric electrodes separated by a thick YSZ electrolyte (~360 μm). The symmetric electrodes are comprised of a porous YSZ scaffold layer, synthesized as shown above. Approximately 1.5 mg of the appropriate R-P oxide is drop-coated onto the scaffolds on each of the electrodes. Gold mesh and wires are used as current collectors and attached symmetrically on the electrodes. The cell is placed in a single chamber alumina reactor under a 50 sccm flow of $O_2$. The reactor is heated to the desired temperature and impedance spectra are obtained under open circuit voltage (OCV) conditions from a frequency range of $10^6$ to 0.01 Hz, with an AC perturbation of 10 mV, using a Gamry Reference 3000 potentiostat. The components of the time dependent impedance signal are de-convoluted by fitting to previously described models using the Gamry Analyst software.

Further aspects of the method of forming the mixed metal oxide materials, the composition of the mixed metal oxide materials, the properties exhibited by the mixed metal oxide materials, and the various uses thereof are provided in following sections.

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method of forming a metal oxide material having a rod shape or a polyhedral nanostructure; the method comprising:
    preparing a first reverse micro-emulsion system comprising a precipitating agent dispersed in a first aqueous medium;
    preparing a second reverse micro-emulsion system containing a metal salt dispersed in a second aqueous medium, wherein preparing the second reverse micro-emulsion system includes ultrasonicating to obtain a transparent micro-emulsion suspension of the metal salt dispersed in the second aqueous medium;
    combining the first and second reverse micro-emulsions together to initiate a reaction;

allowing the reaction to continue for a predetermined amount of time to form a product mixture comprising a metal oxide gel and the first and second aqueous media;

separating the metal oxide gel from the first and second aqueous media;

collecting the metal oxide gel; and calcining the metal oxide gel to form the metal oxide material;

wherein the metal oxide material corresponds to the chemical formula of $La_2M_xNi_{1-x}O_4$, $Pr_{2-y}A_yNiO_4$, or $La_{2-z}D_zNiO_4$, wherein M is copper (Cu), cobalt (Co), iron (Fe), manganese (Mn), chromium (Cr), aluminum (Al), or platinum (Pt); A is lanthanum (La) or neodymium (Nd); D is calcium (Ca), barium (Ba) or strontium (Sr); x ranges from 0 to 1; y ranges from 0 to 2; and z ranges from 0 to 0.25.

2. The method according to claim 1, wherein the first and second aqueous media further comprises one or more of a surfactant, a co-surfactant, and a co-solvent, such that the surfactant is cetyl tetrammoniabromide (CTAB), the co-surfactant is an aliphatic hydrocarbon that has at least six carbon atoms, and the co-solvent is an aliphatic alcohol.

3. The method according to claim 2, wherein the co-surfactant is hexane and the co-solvent is n-butanol.

4. The method according to claim 1, wherein the first and second aqueous media comprises a molar ratio (Wo) of water to surfactant that is controlled at a value of about 1.6.

5. The method according to claim 1, wherein the metal salt comprises a combination of metal cations that are independently selected from the elements of La, Pr, Mn, Cr, Ni, Fe, Co, Cu, Pt, Nd, Ca, Ba, or Sr, and an anion that is independently selected from a nitrate, an acetate, a chloride, or a combination thereof.

6. The method according to claim 1, wherein the precipitating agent is an alkali metal hydroxide, an alkali metal carbonate, or a combination thereof.

7. The method according to claim 1, wherein the predetermined amount of time is at least 4 hours.

8. The method according to claim 1, wherein separating the metal oxide gel from the first and second aqueous media comprises filtering or centrifuging the product mixture.

9. The method according to claim 1, wherein the method further comprises washing the metal oxide gel with water/ethanol and drying the metal oxide gel in an oven at 80° C. prior to calcination.

10. The method according to claim 1, wherein the calcination is performed at a temperature that is in the range of about 700° C. to about 1,000° C.

11. The method according to claim 1, wherein at least one of the metal salt and the precipitating agent are present in a stoichiometric amount.

12. The method according to claim 1, wherein the metal oxide material is a Ruddlesden-Popper (R-P) oxide material.

13. The method according to claim 1, wherein the metal oxide material corresponds to the chemical formula of $La_2M_xNi_{1-x}O_4$, wherein M is Co, Fe, or Mn, and x ranges from greater than 0 to 1.

14. The method according to claim 1, wherein the metal oxide material corresponds to the chemical formula of $La_2M_xNi_{1-x}O_4$, wherein M is Al, Mn, Fe, Co, or Cu, and x is 0.5.

15. The method according to claim 1, wherein the metal oxide material corresponds to the chemical formula of $La_2M_xNi_{1-x}O_4$, wherein M is Fe, Cu, Cr, Mn, or Co, and x is 0.12.

16. The method according to claim 1, wherein the metal oxide material corresponds to the chemical formula of $La_{2-z}D_zNiO_4$, wherein D is Ca, Ba, or Sr and z ranges from greater than 0 to 0.25.

17. The method according to claim 1, further comprising washing the metal oxide gel after separating the metal oxide gel from the first and second aqueous media, wherein washing the metal oxide gel includes adding a solvent and ultrasonicating the metal oxide gel in the solvent.

18. A method of forming a metal oxide material having a rod shape or a polyhedral nanostructure; the method comprising:

preparing a first reverse micro-emulsion system comprising a precipitating agent dispersed in a first aqueous medium;

preparing a second reverse micro-emulsion system containing a metal salt dispersed in a second aqueous medium; wherein preparing the second reverse micro-emulsion system includes ultrasonicating to obtain a transparent micro-emulsion suspension of the metal salt dispersed in the second aqueous medium combining the first and second reverse micro-emulsions together to initiate a reaction;

allowing the reaction to continue for a predetermined amount of time to form a product mixture comprising a metal oxide gel and the first and second aqueous media;

separating the metal oxide gel from the first and second aqueous media;

collecting the metal oxide gel; and calcining the metal oxide gel to form the metal oxide material;

wherein the metal oxide material corresponds to the chemical formula of $La_2M_xNi_{1-x}O_4$ or $La_{2-z}D_zNiO_4$, wherein M is copper (Cu), cobalt (Co), iron (Fe), manganese (Mn), chromium (Cr), aluminum (Al), or platinum (Pt); D is calcium (Ca), barium (Ba) or strontium (Sr); x ranges from greater than 0 to 1; and z ranges from greater than 0 to 0.25.

19. The method according to claim 18, wherein the metal oxide material corresponds to the chemical formula of $La_2M_xNi_{1-x}O_4$, wherein M is Al, Mn, Fe, Co, or Cu, and x is 0.5.

20. The method according to claim 18, wherein the metal oxide material corresponds to the chemical formula of $La_2M_xNi_{1-x}O_4$, wherein M is Fe, Cu, Cr, Mn, or Co, and x is 0.12.

21. The method according to claim 18, wherein the metal oxide material corresponds to the chemical formula of $La_{2-z}D_zNiO_4$, wherein D is Sr and z ranges from greater than 0 to 0.25.

22. The method according to claim 18, further comprising washing the metal oxide gel after separating the metal oxide gel from the first and second aqueous media, wherein washing the metal oxide gel includes adding a solvent and ultrasonicating the metal oxide gel in the solvent.

* * * * *